(12) United States Patent
Obara

(10) Patent No.: US 10,845,727 B2
(45) Date of Patent: Nov. 24, 2020

(54) OPTICAL SCANNING APPARATUS AND IMAGE FORMING APPARATUS

(71) Applicant: CANON KABUSHIKI KAISHA, Tokyo (JP)

(72) Inventor: Mitsuhiro Obara, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/352,583

(22) Filed: Mar. 13, 2019

(65) Prior Publication Data

US 2019/0286008 A1    Sep. 19, 2019

(30) Foreign Application Priority Data

Mar. 16, 2018  (JP) ................. 2018-049159

(51) Int. Cl.
| | |
|---|---|
| *G03G 15/04* | (2006.01) |
| *G03G 15/00* | (2006.01) |
| *G03G 15/043* | (2006.01) |
| *G02B 26/12* | (2006.01) |

(52) U.S. Cl.
CPC ....... *G03G 15/04072* (2013.01); *G02B 26/12* (2013.01); *G03G 15/0435* (2013.01); *G03G 15/55* (2013.01); *G03G 15/80* (2013.01); *G03G 2215/0404* (2013.01)

(58) Field of Classification Search
CPC ............... G03G 15/04036; G03G 15/04072
See application file for complete search history.

(56) References Cited

U.S. PATENT DOCUMENTS

| | | | |
|---|---|---|---|
| 7,508,859 B2 | 3/2009 | Azami et al. ............ | 372/101 |
| 8,355,192 B2 | 1/2013 | Obara .................. | 359/204.1 |
| 8,681,405 B2 | 3/2014 | Obara .................. | 359/204.1 |
| 8,786,927 B2 | 7/2014 | Obara .................. | 359/204.1 |
| 9,857,722 B2 | 1/2018 | Obara ............. | G03G 15/04036 |
| 2008/0212627 A1* | 9/2008 | Abe .................. | B41J 2/473 |
| | | | 372/38.02 |
| 2011/0169906 A1* | 7/2011 | Suzuki ................ | B41J 2/473 |
| | | | 347/224 |
| 2013/0147890 A1* | 6/2013 | Sawamoto ........ | G03G 15/043 |
| | | | 347/118 |

FOREIGN PATENT DOCUMENTS

JP      2003-140070      5/2003

* cited by examiner

*Primary Examiner* — Walter L Lindsay, Jr.
*Assistant Examiner* — Andrew V Do
(74) *Attorney, Agent, or Firm* — Venable LLP

(57) ABSTRACT

An optical scanning apparatus includes a first light source, a second light source, a first driving element, a second driving element, a rotatable polygonal mirror, a first scanning optical portion, a second scanning optical portion, a detecting element, and a circuit board. The first light source, the first driving element and the detecting element are arranged in a named order on the circuit board. The following relationship is satisfied: θ1>θ2, where θ1 is an angle formed by a direction of the first laser light and a first direction, and θ2 is an angle formed by a direction of the second laser light and a second direction.

14 Claims, 11 Drawing Sheets

OPTICAL SCANNING APPARATUS AND IMAGE FORMING APPARATUS

FIELD OF THE INVENTION AND RELATED ART

The present invention relates to an optical scanning apparatus provided in an image forming apparatus such as a copying machine or a printer.

Conventionally, in the optical scanning apparatus used in a laser beam printer, a digital copying machine or the like, a photosensitive drum is scanned with laser light optically modulated and emitted from a light source depending on an image signal, by a light deflector such as a rotatable polygonal mirror in a periodically deflection-scanning manner. Then, an image is formed in a spot shape on an imaging plane of the photosensitive drum by a scanning optical member having an fθ characteristic. Here, the fθ characteristic is a characteristic of a lens such that when light enters the lens at an angle θ, an image with a size (fxθ) obtained by multiplying the angle θ by a focal length f of the lens is formed.

Spots on the imaging plane from an electrostatic latent image on a surface of the photosensitive drum electrically charged, so that image recording is carried out. In the case where this optical scanning apparatus is applied to a color image forming apparatus, for example, a color image is formed on a recording material such as a sheet by superposing images of four colors consisting of yellow Y, magenta M, cyan c and black K.

For the purpose of cost reduction of the optical scanning apparatus, a single light deflector is used for two photosensitive drums for two colors of four photosensitive drums for the four colors (Y, M, C, K) in a shared basis. In this case, a constitution in which two scanning optical members corresponding to the two photosensitive drums different in color are symmetrically provided on both sides between which the single light deflector is sandwiched and in which laser light beams emitted from two light sources of the two scanning optical members are caused to be incident on different surfaces of a rotatable polygonal mirror as the light deflector and are deflected and thus the photosensitive drums are scanned with the laser light beams has been proposed.

In addition, use of a multi-beam of a semiconductor laser has advanced, so that a package size of the semiconductor laser has become large due to upsizing of a laser chip in a semiconductor laser element and in view of circumstances of wiring. Further, in order to improve an optical performance such as a spot diameter of the laser light beam emitted from the light source, an adjusting space when positional adjustment of the light source is performed and component parts are assembled is needed. For this reason, ensuring of a clearance between adjacent light sources is required.

In Japanese Laid-Open Patent Application (JP-A) 2003-140070, semiconductor lasers are provided and arranged so that an angle formed by each of laser light beams emitted from semiconductor lasers toward a rotatable polygonal mirror and an optical axis passing through centers of scanning lenses in a direction perpendicular to longitudinal directions of the scanning lenses is smaller than 90°.

However, in JP-A 2003-140070, in the case where the optical scanning apparatus is intended to be further downsized, there arises a problem shown in a reference example described below. FIG. 12 is a plan illustration showing a structure of an optical scanning apparatus 190 as the reference example. FIG. 13 is a side illustration showing a structure of circuit boards 184Y and 184M on a surface side of the optical scanning apparatus 190 as the reference example. Incidentally, for simplification of explanation, description will be made using only the optical scanning apparatus 190 for yellow Y and magenta M used for two photosensitive drums 2Y and 2M of four photosensitive drums 2Y, 2M, 2C and 2K for four colors of yellow Y, magenta M, cyan C and black K. In FIG. 12, a cover member 188YM for covering an opening of a housing 180YM of the optical scanning apparatus 190 is omitted from illustration.

As shown in FIG. 12, in the optical scanning apparatus 190 of the reference example, a light deflector 174YM is provided inside and at a central portion of the housing 180YM. On both sides sandwiching the light deflector 174YM, scanning optical members such as 176Y and 176M and the like provided correspondingly to the photosensitive drums 2Y and 2M for different two colors of yellow Y and magenta M are symmetrically provided.

An angle θdY formed by laser light (beam) LY emitted from a semiconductor laser 170Y toward a rotatable polygonal mirror 173YM and an optical axis LYd1 of a scanning lens 176Y for the light LY which is reflected by a reflecting surface of the rotatable polygonal mirror 173YM and which passes through the scanning lens 176Y will be considered. Here, the optical axis of the scanning lens refers to an axis of the light passing through a center of the scanning lens in a direction perpendicular to the longitudinal direction of the scanning lens. Further, an angle θdM formed by laser light (beam) LM emitted from a semiconductor laser 170M toward the rotatable polygonal mirror 173YM and an optical axis LMd1 of a scanning lens 176M for the light LM which is reflected by another reflecting surface of the rotatable polygonal mirror 173YM and which passes through the scanning lens 176M will be considered. The angle θdY and the angle θdM which are shown in FIG. 12 are set so as to be equal to each other.

Similarly as the scanning lenses 176Y and 176M, also the semiconductor lasers 170Y and 170M are symmetrically provided on both sides sandwiching the light deflector 174YM with a rectilinear line 3YM, as a center line, passing through a rotation center of a rotation shaft 173YMa of the rotatable polygonal mirror 173YM. Also the laser light beams LY and LM emitted from the semiconductor lasers 170Y and 170M, respectively, are symmetrically provided on both sides sandwiching the light deflector 174YM with the rectilinear line 3YM as the center line. Adjacently to the semiconductor laser 170Y, a horizontal synchronization sensor 182Y for determining timing of writing onto the photosensitive drum 2Y with respect to a main scan direction is provided. The laser light (beam) LY emitted from the semiconductor laser 170Y is reflected by the rotatable polygonal mirror 173 YM and is detected by the horizontal synchronization sensor 182Y.

Here, the case where the optical scanning apparatus 190 shown in FIG. 12 is downsized with respect to an arrangement direction (left-right direction of FIG. 12) of the photosensitive drums 2Y and 2M will be considered. In this case, it would be considered that the scanning lenses 176Y and 176M are disposed adjacently to the light deflector 174YM. In such a case, there is a possibility that laser light LYb which is reflected by the rotatable polygonal mirror 173YM and which enters the horizontal synchronization sensor 182Y strikes an end portion 176Y1 of the scanning lens 176Y. In that case, there is a liability that the laser light LYb entering the horizontal synchronization sensor 182Y adversely affects an image and light emission control by the influence of light (stray light) passing through a path different from an original optical path.

Here, an angle θaY formed by the laser light LY emitted from the semiconductor laser 170Y toward the rotatable polygonal mirror 173YM and the laser light LYb which is reflected by the rotatable polygonal mirror 173YM and which enters the horizontal synchronization sensor 182Y will be considered. It would be considered that the semiconductor laser 170Y and the horizontal synchronization sensor 182Y which are mounted on the circuit board 184Y are disposed adjacently to each other.

In this case, as shown in FIG. 13, a distance between the semiconductor laser 170Y and the horizontal synchronization sensor 182Y which are mounted on the circuit board 184Y becomes short. Mounting of the semiconductor laser 170Y and the horizontal synchronization sensor 182Y on the circuit board 184Y is performed by soldering from a back surface side to a front surface side of the circuit board 184Y through a through hole. For this reason, on the front surface of the circuit board 184Y shown in FIG. 13, lead terminals of each of the semiconductor laser 170Y and the horizontal synchronization sensor 182Y and soldered portions where the lead terminals are soldered to land portions of a circuit pattern are shown. Incidentally, the semiconductor laser 170Y is constituted as a beam laser emitting four laser light beams from a single package.

On the other hand, in order to modulate the laser light beams emitted from the semiconductor lasers 170Y and 170M depending on an image signal, laser driving ICs (Integrated Circuits: semiconductor integral circuits) 183Y and 183M are needed. The laser driving IC 183Y may desirably be provided close to the semiconductor laser 170Y from the viewpoints of suppression of deterioration of the signal and noise.

In such a case, on the circuit board 184Y shown in FIG. 13, between the semiconductor laser 170Y and the horizontal synchronization sensor 182Y, there is no space in which the laser driving IC 183Y is provided. For this reason, the laser driving IC 183Y has to be disposed at a position shifted from the semiconductor laser 170Y in an up-down direction of FIG. 13. As a result, a height of the circuit board 184Y becomes high, so that there is a problem such that a maximum thickness $H_{YM}$ of the optical scanning apparatus 190 shown in FIG. 13 becomes large and thus the optical scanning apparatus 190 is upsized.

SUMMARY OF THE INVENTION

The present invention has solved the above-described problem, and a principal object of the present invention is to provide an optical scanning apparatus capable of being downsized.

According to an aspect of the present invention, there is provided an optical scanning apparatus comprising: a first light source; a second light source; a first driving element configured to drive the first light source to generate first laser light depending on an image signal; a second driving element configured to drive the second light source to generate second laser light depending on the image signal; a rotatable polygonal mirror having a plurality of reflecting surfaces; a first scanning optical portion configured to guide, to a first image bearing member, the first laser light reflected by the reflecting surface; a second scanning optical portion configured to guide, to a second image bearing member, the second laser light reflected by the reflecting surface; a detecting element configured to detect the first laser light reflected by the reflecting surface and then to output a signal for controlling a writing position onto the first image bearing member with respect to a main scan direction; and a circuit board on which at least the first light source, and first driving element and the detecting element are mounted, wherein the first light source, the first driving element and the detecting element are arranged in a named order on the circuit board, and wherein the following relationship is satisfied: θ1>θ2, where θ1 is an angle formed by a direction of the first laser light emitted from the first light source toward the reflecting surface and a first direction perpendicular to a longitudinal direction of the first scanning optical portion on the same flat plane including the first laser light, and θ2 is an angle formed by a direction of the second laser light emitted from the second light source toward the reflecting surface and a second direction perpendicular to a longitudinal direction of the second scanning optical portion on the same flat plane including the second laser light.

Further features of the present invention will become apparent from the following description of exemplary embodiments with reference to the attached drawings.

DESCRIPTION OF EMBODIMENTS

An embodiment of an optical scanning apparatus according to the present invention will be specifically described. In the following embodiments, numerical values are not limited to specific numerical values shown as example.

<Image Forming Apparatus>

Figure 1:
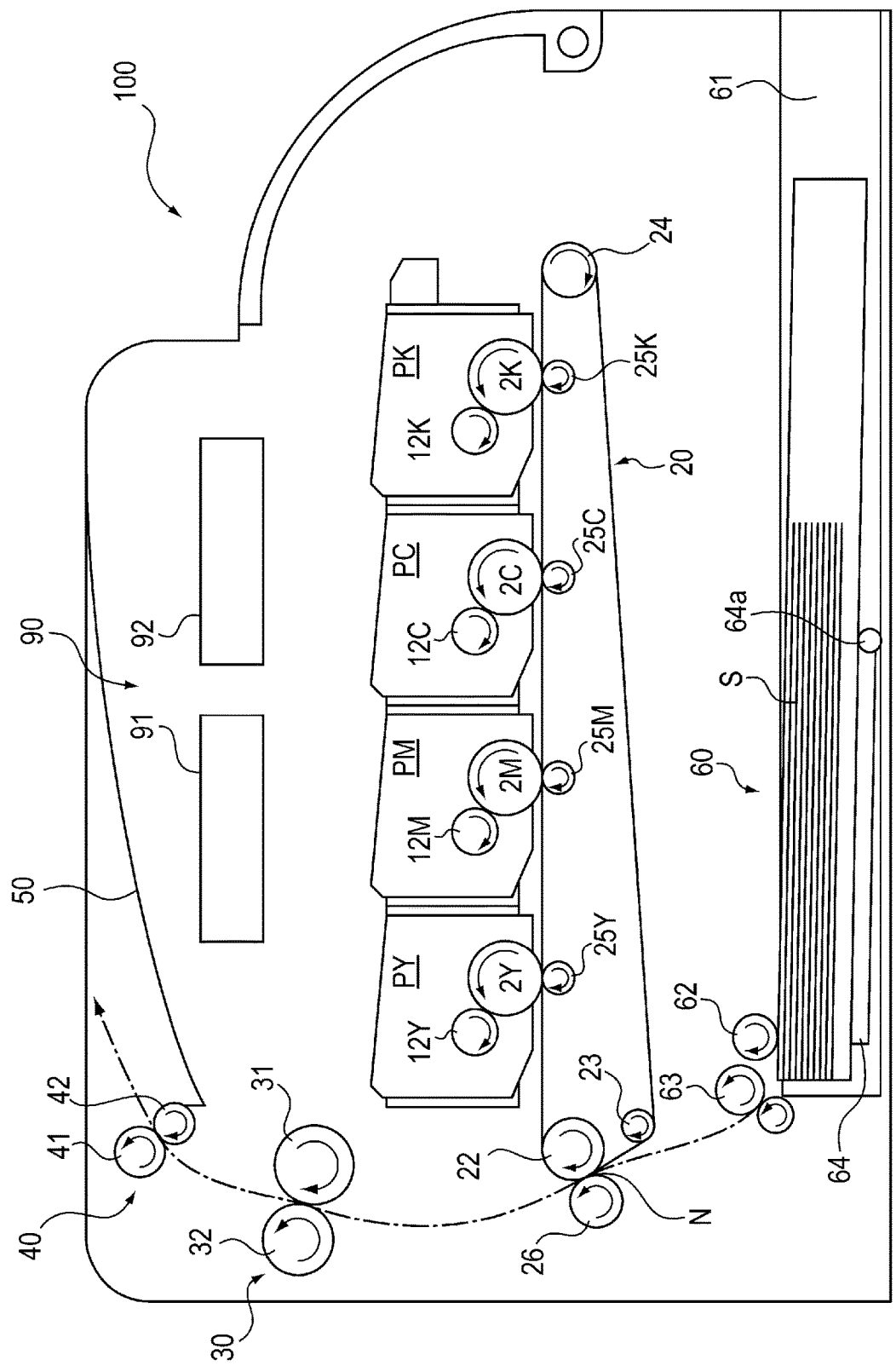
FIG. 1 is a sectional illustration showing a structure of an image forming apparatus in which optical scanning apparatuses according to the present invention are mounted.

A structure of an image forming apparatus 100 in which an optical scanning apparatus 90 according to the present invention is mounted will be described. FIG. 1 is a sectional illustration showing the structure of the image forming apparatus 100 in which the optical scanning apparatus 90 according to the present invention is mounted. The image forming apparatus 100 shown in FIG. 1 is an example of a color laser beam printer. As regards the image forming apparatus 100 shown in FIG. 1, in the following, a side (surface) where a process cartridge PY for yellow Y is provided is defined as a main assembly left side, and a side (surface) where a process cartridge PK for black K is provided is defined as a main assembly right side.

The image forming apparatus 100 shown in FIG. 1 is constituted in a tandem type with an in-line structure in which four process cartridges PY, PM, PC and PK for colors of yellow Y, magenta M, cyan C and black K, respectively, are juxtaposed in a substantially horizontal direction from the main assembly left side toward the main assembly right side.

The respective process cartridges PY, PM, PC and PK are constituted substantially similar to each other except that colors of toners (developers) accommodated in unshown developing devices for the respective colors, and therefore are also described simply using the process cartridge P in some cases. This is also true for other image forming process means. The respective process cartridges P are constituted as image forming portions for forming, on a recording material S, toner images carried on respective photosensitive drums 2 as a plurality of image bearing member.

The process cartridges P in this embodiment include photosensitive drums 2Y, 2M, 2C and 2K as the image bearing members. Further, the process cartridges P include developing rollers 12Y, 12M, 12C and 12K which are developer carrying members, and the like as the image forming process means actable on the photosensitive drums 2. These means are integrally assembled into the respective process cartridges P.

Figure 5:
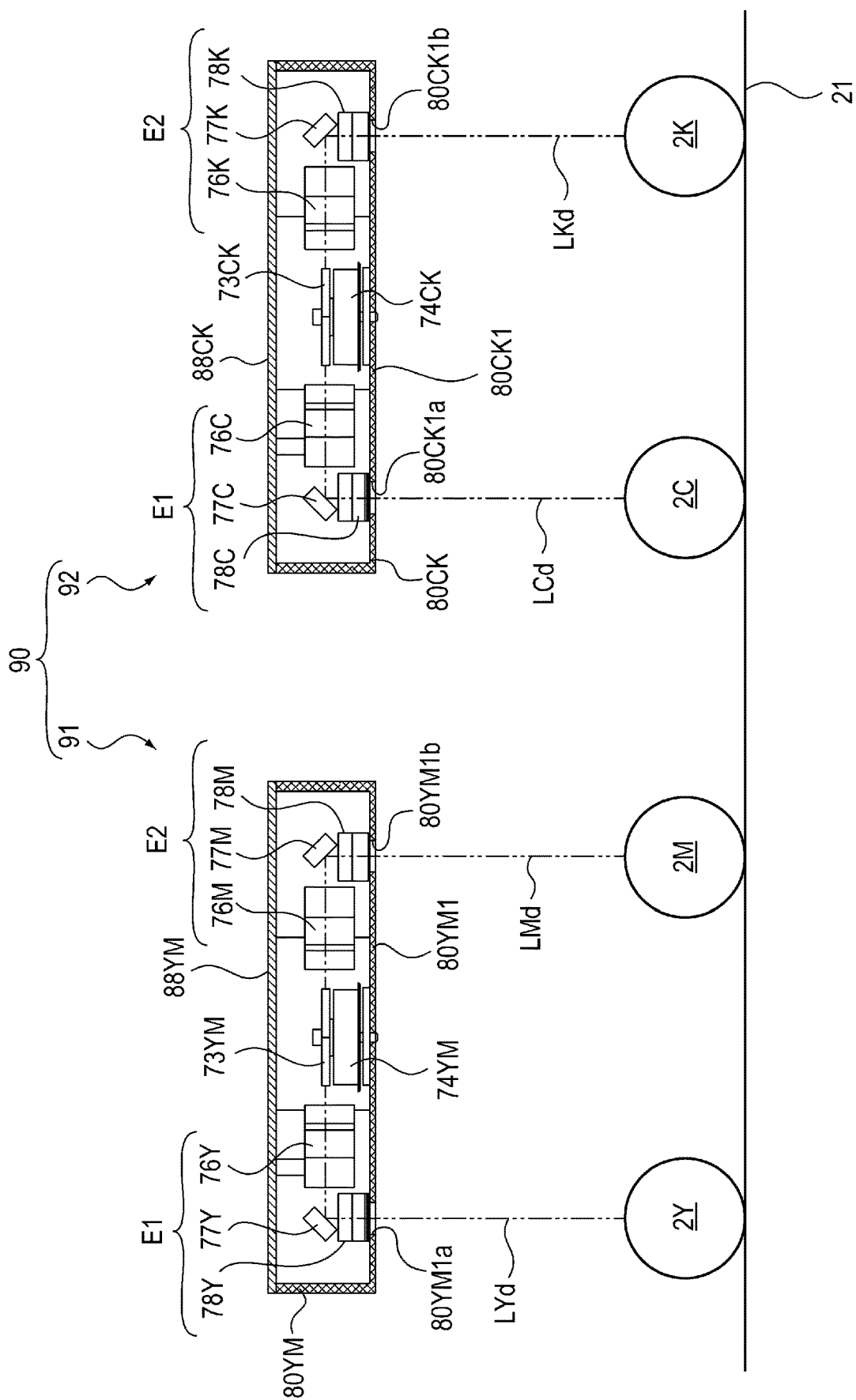
FIG. 5 is a sectional view taken along A-A line of FIG. 2.

Above two process cartridges PY and PM, a first optical scanning apparatus 91 is provided, and above other two process cartridges PC and PK, a second optical scanning apparatus 92 is provided. As shown in FIG. 5, surfaces of the photosensitive drums 2 which are the plurality of image bearing members are irradiated and scanned with laser light beams LYd, LMd, LCd and LKd emitted by the optical scanning apparatus 90 including the first optical scanning apparatus 91 and the second optical scanning apparatus 92.

The surfaces of the photosensitive drums 2 rotating in the counterclockwise direction of FIG. 1 are electrically charged uniformly by charging devices which are unshown charging means. The respective optical scanning apparatus 91 and 92 expose the surfaces of the uniformly charged photosensitive drums 2 to the laser light beams on the basis of image data inputted from an unshown image data inputting portion so that the photosensitive drum surfaces are scanned with the laser light beams. As a result, electrostatic latent images of the respective colors are successively formed on the surfaces of the photosensitive drum 2. To the electrostatic latent images formed on the surfaces of the photosensitive drums 2, the toners (developers) of the respective colors are supplied from the developing rollers 12, and the electrostatic latent images are developed as the toner images.

Under the process cartridges P, an intermediary transfer unit 20 is provided. In the intermediary transfer unit 20, an intermediary transfer belt 21 is stretched rotatably in the clockwise direction of FIG. 1 by a driving roller 22, a follower roller 23 and a tension roller 24. The surfaces of the photosensitive drums 2Y, 2M, 2C and 2K are provided in contact with outer peripheral surface of the intermediary transfer belt 21.

On an inner peripheral surface side of the intermediary transfer belt 21, four primary transfer rollers 25Y, 25M, 25C and 25K which are primary transfer means are provided.

To the driving roller 22, the intermediary transfer belt 21 is contacted while contacting a secondary transfer roller 26 which is a secondary transfer means on a side opposite from the driving roller 22. At an upper portion of a main assembly of the image forming apparatus 100 on a left side, a fixing device 30 and a discharging device 40 are provided. The fixing device 30 is constituted by including a fixing unit 31 provided with a fixing film and by including a pressing roller 32. The discharging device 40 is constituted by discharging rollers 41 and 42.

When a primary transfer bias is applied from an unshown primary transfer voltage source to the respective primary transfer rollers 25, the toner images of the respective colors formed on the surfaces of the photosensitive drums 2 are successively primary-transferred superposedly onto the outer peripheral surface of the intermediary transfer belt 21. The toners remaining on the surfaces of the photosensitive drums 2 after the primary transfer are removed and collected by unshown cleaning means.

On the other hand, below the intermediary transfer unit 20, a feeding unit 60 is provided. Recording materials S accommodated on an intermediary plate 64 in a feeding cassette 61 provided in the feeding unit 60 are raised by rotation of the intermediary plate 64 about a rotation center 64a in the clockwise direction of FIG. 1, so that an uppermost recording material S is press-contacted to a feeding roller 62.

Thereafter, the recording material S is fed by the feeding roller 62 by the rotation of the feeding roller 62 in the clockwise direction of FIG. 1, so that the recording materials S are separated and fed one by one in cooperation with an unshown separating means. A reading end portion of the recording material S fed by the feeding roller 62 is abutted against a registration roller pair 63 which are at rest, so that oblique movement of the recording material S is corrected. Thereafter, the recording material S is nipped and fed by the registration roller pair 63 so that the recording material S is synchronized with a leading end of the toner images carried on the outer peripheral surface of the intermediary transfer belt 21 reaches a secondary transfer portion N consisting of the outer peripheral surface of the intermediary transfer belt 21 and the secondary transfer roller 26.

When a secondary transfer bias is applied from an unshown secondary transfer voltage source to the secondary transfer roller 26, the toner images carried on the outer peripheral surface of the intermediary transfer belt 21 are collectively secondary-transferred onto the recording material S at the secondary transfer portion N. The toners remaining on the outer peripheral surface of the intermediary transfer belt 21 after the secondary transfer are removed and collected by an unshown cleaning means.

The recording material S is heated and pressed during nip-feeding by the fixing film of the fixing unit 31 and the pressing roller 32 which are provided in the fixing device 30, so that the toner images are heat-fixed on the recording material S. Thereafter, the recording material S on which the toner images are heat-fixed is nipped and fed by the discharging rollers 41 and 42 provided in the discharging device 40 and is discharged onto a discharge tray 50.

<Optical Scanning Apparatus>

Figure 2:
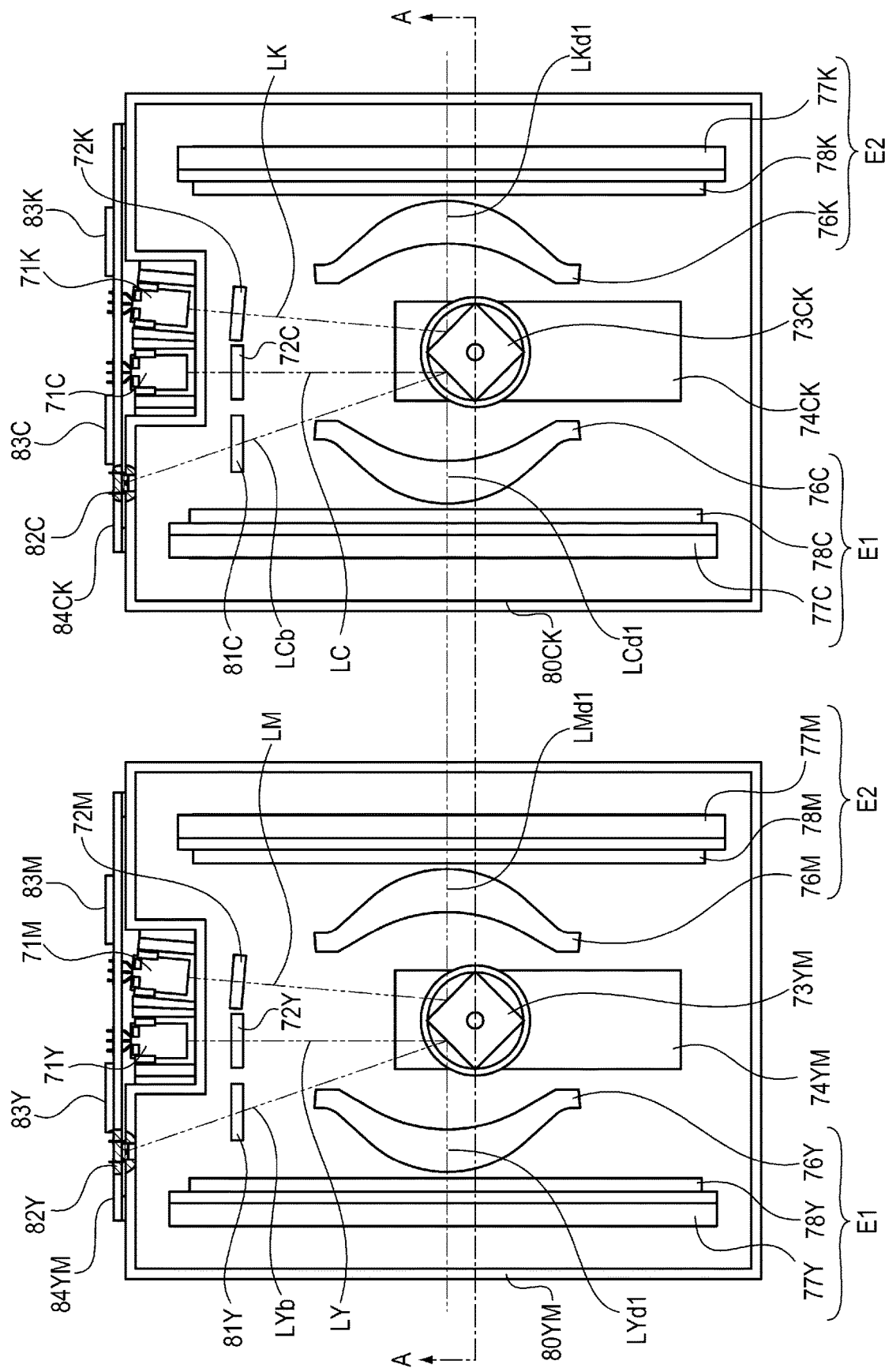
FIG. 2 is a top plan illustration showing structures of the optical scanning apparatuses according to the present invention.
Figure 3:
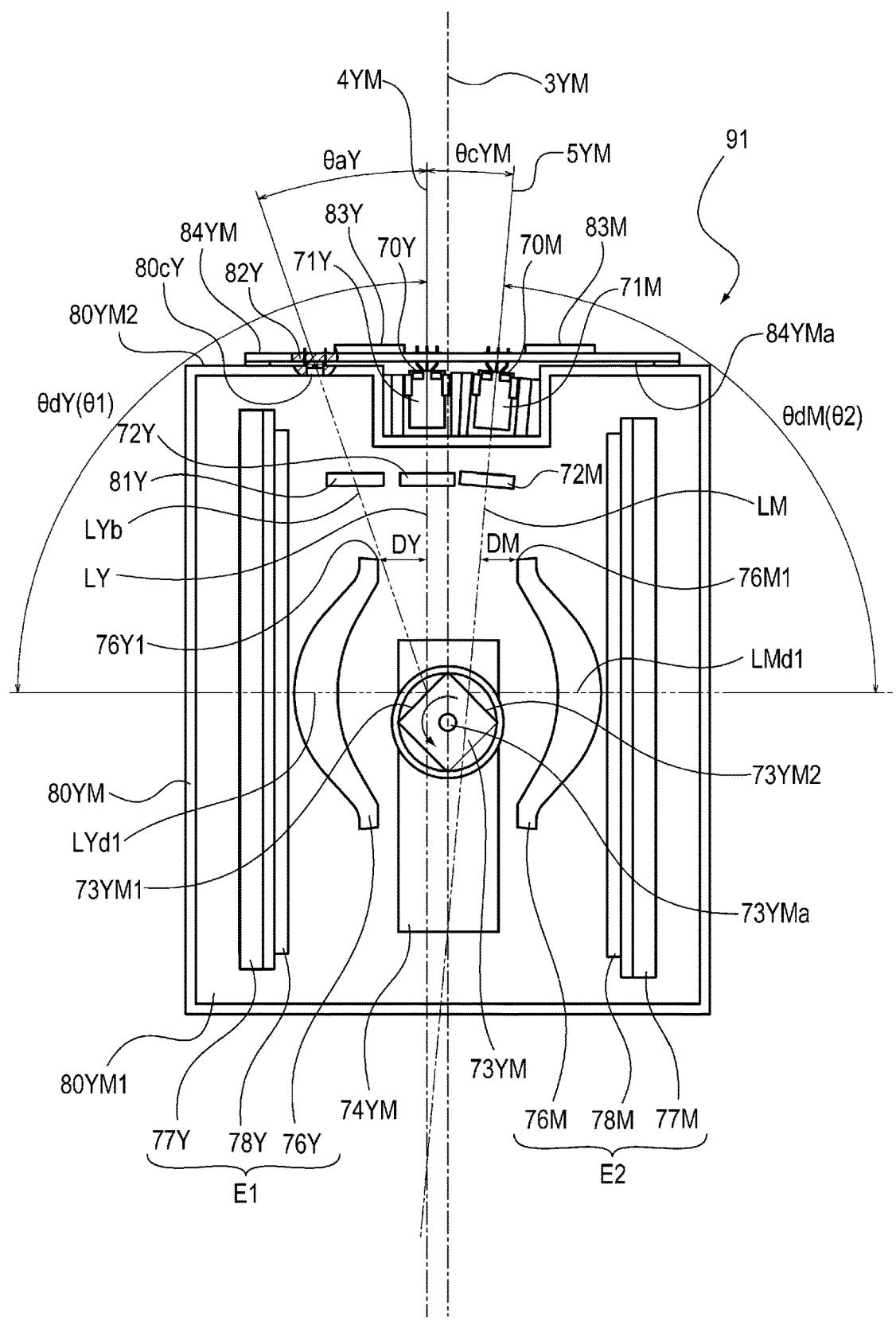
FIG. 3 is a top plan illustration showing the structure of the optical scanning apparatus on yellow and magenta sides of the optical scanning apparatus according to the present invention.
Figure 4:
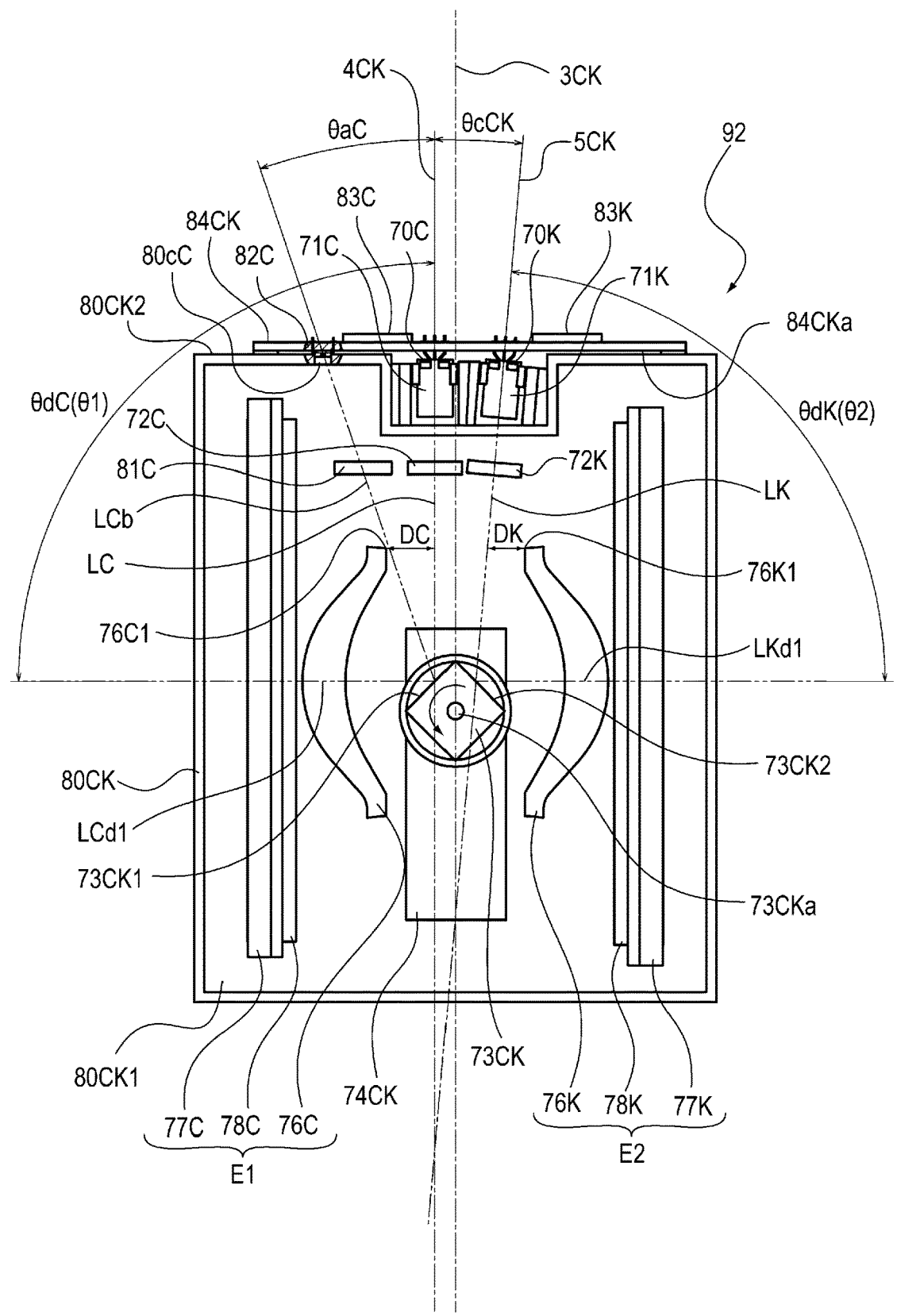
FIG. 4 is a top plan illustration showing the structure of the optical scanning apparatus on cyan and black sides of the optical scanning apparatus according to the present invention.

Then, using FIGS. 2 to 5, structures of the first and second optical scanning apparatuses 91 and 92 constituting the optical scanning apparatus 90 will be described. FIG. 2 is a top plan illustration showing the structures of the first and second optical scanning apparatuses 91 and 92 constituting the optical scanning apparatus 90 according to the present invention. FIG. 3 is a top plan illustration showing the structure of the optical scanning apparatus 91 according to the present invention. FIG. 4 is a top plan illustration showing the structure of the optical scanning apparatus 92 according to the present invention. FIG. 5 is a sectional view taken along A-A line of FIG. 2.

As shown in FIGS. 2 to 5, the optical scanning apparatus 90 according to this embodiment includes the first optical scanning apparatus 91 for irradiating the surfaces of the photosensitive drums 2Y and 2M for yellow Y and magenta M, respectively, with laser light beams LY and LM depending on pieces of image information of yellow Y and magenta M, respectively. Further, the optical scanning apparatus 90 is constituted by including the second optical scanning apparatus 92 for irradiating the surfaces of the photosensitive drums 2C and 2K for cyan C and black K, respectively, with laser light beams LC and LK depending on pieces of image information of cyan C and black K, respectively.

By respective circuit boards 84YM and 84CY, the respective laser light beams LY, LM, LC and LK are emitted from semiconductor lasers 70Y, 70M, 70C and 70K which are drive-controlled by the circuit boards 84YM and 84Ck and which are a plurality of light sources. These laser light beams LY, LM, LC and LK are changed in collimated light beams in a main scan direction (axial direction of the photosensitive drums 2) by anamorphic lenses 72Y, 72M, 72C and 72K and are converged only in a sub-scan direction (circumferential direction of the photosensitive drums 2).

Thereafter, on respective reflecting surfaces of rotatable polygonal mirrors 73YM and 73CK of light deflectors 74YM and 74CK, images are formed as line images. The rotatable polygonal mirrors 73YM and 73CK reflect the respective laser light beams LY, LM, LC and LK emitted from the semiconductor lasers 70Y, 70M, 70C and 70K (a plurality of light sources) at the reflecting surfaces thereof, so that the photosensitive drums 2 are scanned with the laser light beams LY, LM, LC and LK. Each of the anamorphic lenses 72 has two functions as a collimator lens for deflecting the laser light beam (laser light) L into the collimated light beam and a cylinder lens for condensing the laser light L only in the sub-scan direction. Incidentally, the collimator lens and the cylindrical lens may also be separately disposed.

On the circuit boards 84YM and 84CK, the semiconductor lasers 70Y, 70M, 70C and 70K (the plurality of light sources), laser driving ICs 83Y, 83M, 83C and 83K (driving elements) and horizontal synchronization sensors 82Y and 82C (detecting elements) are mounted. The laser driving ICs 83Y and 83M (first driving elements) drive the semiconductor lasers 70Y and 70C (first light sources) and generate the laser light beams LY and LC (first laser light beams) modulated depending on image signals.

The laser driving ICs 83C and 83K (second driving elements) drive the semiconductor lasers 70C and 70K (second light sources) and generate the laser light beams LC and LK (second laser light beams) modulated depending on image signals.

The first optical scanning apparatus 91 and second optical scanning apparatus 92 shown in FIGS. 2 to 4 are provided with a single rotatable polygonal mirror 73YM and a single rotatable polygonal mirror 73CK, respectively, for which a single horizontal synchronization sensor 82Y (detecting element) and a single horizontal synchronization sensor 82C (detecting element) are provided, respectively.

The horizontal synchronization sensors 82Y and 82C (detecting elements) detect the laser light beams LYb and LCb (first laser light beams) reflected by first reflecting surfaces 73YM1 and 73CK1 of the rotatable polygonal mirrors 73YM and 73CK, respectively. As a result, the horizontal synchronization sensors 82Y and 82C output signals for controlling writing positions onto the photosensitive drums 2Y and 2C (first image bearing members), respectively, with respect to the main scan direction (rotational axis direction). Exposure scanning of the photosensitive drums 2Y and 2C (first image bearing members) with the laser light beams with respect to the main scan direction (the axial direction of the photosensitive drum 2) is started at timing which is a lapse of a predetermined time from entrance of the laser light beams LYb and LCb into the horizontal synchronization sensors 82Y and 82C.

As shown in FIG. 5, laser light beams LYd, LMd, LCd and LKd deflected by the rotatable polygonal mirrors 73YM and 73CK pass through first scanning lenses 76Y, 76M, 76C and 76K, and are reflected by mirrors 77Y, 77M, 77C and 77K. Thereafter, the laser light beams pass through second scanning lenses 78Y, 78M, 78C and 78K, and then pass through openings 80YM1a, 80YM1b, 80CK1a and 80CK1b provided in bottom plates 80YM1 and 80CK1 of housings 80YM and 80CK, respectively. Then, images are formed on the surfaces of the photosensitive drums 2Y, 2M, 2C and 2K.

<Scanning Optical Portion>

Scanning optical portions for guiding the photosensitive drums 2 (image bearing members) with the laser light beams reflected by the reflecting surfaces of the rotatable polygonal mirrors 73YM and 73CK are provided. As shown in FIG. 2, a first scanning optical portion E1 guides the laser light beams LY and LC (first laser light beams), reflected by the first reflecting surfaces 73YM1 and 73CK1 of the rotatable polygonal mirrors 73YM and 73CK, to the corresponding photosensitive drums 2Y and 2C (first image bearing members). The first scanning optical portion E1 is constituted by including the first scanning lenses 76Y and 76C, the mirrors 77Y and 77C and the second scanning lenses 78Y and 78C.

A second scanning optical portion E2 guides the laser light beams LM and LK (second laser light beams), reflected by the second reflecting surfaces 73YM2 and 73CK2 of the rotatable polygonal mirrors 73YM and 73CK, to the corresponding photosensitive drums 2M and 2K (second image bearing members). The second scanning optical portion E2 is constituted by including the first scanning lenses 76M and 76K, the mirrors 77M and 77K and the second scanning lenses 78M and 78K. However, the first scanning optical portion E1 and the second scanning optical portion E2 are not limited to the above-described constitutions. For example, only by the first scanning lens 76M, the first scanning optical portion E1 may also be constituted.

Each of rectilinear lines 3YM and 3CK passing through rotation centers of rotation shafts 73YMa and 73CKa of the rotatable polygonal mirrors 73YM and 73CK, respectively, is an axis of symmetry. At that time, the first scanning lens 76Y, 76M, 76C and 76K, the mirrors 77Y, 77M, 77C and 77K and the second scanning lenses 78Y, 78M, 78C and 78K are disposed symmetrically with the rectilinear lines 3YM and 3CK as the axes of symmetry. Then, the laser light beams LY, LM, LC and LK with which the associated photosensitive drums 2Y, 2M, 2C and 2K (image bearing members) are scanned by the rotatable polygonal mirrors 73YM and 73Ck are guided to the photosensitive drums. These members (76Y to 76K, 77Y to 77K, 78Y to 78K) are constituted as the scanning optical portions.

As shown in FIGS. 2 to 4, the first and second optical scanning apparatuses 91 and 92 are provided with the rotatable polygonal mirrors 73YM and 73CK at substantially central portions of bottom plates 80YM1 and 80CK1 of housings 80YM and 80CK. Here, the rectilinear lines 3YM and 3CK passing through the rotation centers of the rotation shafts 73YMa and 73CKa of the rotatable polygonal mirrors 73YM and 73CK will be considered. The first scanning lenses 76Y and 76M are disposed symmetrically with the rectilinear line 3YM as the axis of symmetry while sandwiching the light deflector 74YM therebetween.

Further, the first scanning lenses 76C and 76K are also disposed symmetrically with the rectilinear line 3CK as the axis of symmetry while sandwiching the light deflector 74CK therebetween. Further, the mirrors 77Y and 77M are also disposed symmetrically with the rectilinear line 3YM as the axis of symmetry while sandwiching the light deflector 74YM therebetween. Further, the mirrors 77C and 77K are also disposed symmetrically with the rectilinear line 3CK as the axis of symmetry while sandwiching the light deflector 74CK therebetween.

Further, the second scanning lenses 78Y and 78M are also disposed symmetrically with the rectilinear line 3YM as the axis of symmetry while sandwiching the light deflector 74YM therebetween. Further, the second scanning lenses 78C and 78K are also disposed symmetrically with the rectilinear line 3CK as the axis of symmetry while sandwiching the light deflector 74CK therebetween.

Further, the first scanning optical portion E1 and the second scanning optical portion E2 are disposed symmetrically with each of the rectilinear lines 3YM and 3CK as the axis of symmetry. Further, with the rectilinear lines 3YM and 3CK (axes of symmetry) as boundaries, the semiconductor lasers 70Y and 70C (first light sources), the laser driving ICs 83Y and 83C (first driving elements) and the horizontal synchronization sensors 82Y and 82C (detecting elements) are provided on the first scanning optical portion E1 side.

Further, with the rectilinear lines 3YM and 3CK (axes of symmetry) as boundaries, the semiconductor lasers 70M and 70K (second light sources) and the laser driving ICs 83M and 83K (second driving elements) are provided on the second scanning optical portion E2 side. In such a state, the scanning optical portions E1 and E2 are incorporated in the housings 80YM and 80CK. Upper openings of the housings 80YM and 80CK are covered with cover members 88YM and 88CK, respectively.

As shown in FIGS. 2 to 4, the laser light beams LY and LC (first laser light beams) emitted from the semiconductor lasers 70Y and 70C (first light sources) of the first and second optical scanning apparatus 91 and 92 are reflected by the reflecting surface of the rotatable polygonal mirrors 73YM and 73CK, respectively. The reflected laser light beams LYb and LCb pass through BD (Beam Detect) lenses 81Y and 81C, respectively. Further, the laser light beams LYb and LCb are condensed in the main scan directions (axial directions of the photosensitive drums 2). In that state, the laser light beams pass through positioning holes 80cY and 80cC which are provided by penetration through side plates 80YM2 and 80CK2 of the housings 80YM and 80CK.

Thereafter, the laser light beams enter the horizontal synchronization sensors 82Y and 82C. The semiconductor lasers 70Y and 70C irradiate the horizontal synchronization sensors 82Y and 82C (detecting elements) with the laser light beams LYb and LCb (first laser light beams) reflected by the first reflecting surfaces 73YM1 and 73CK1 of the rotatable polygonal mirrors 73Y and 73C.

On the other hand, the semiconductor lasers 70M and 70K constituted as the second light sources emit the laser light beams LM and LK, which are then reflected by second reflecting surfaces 73YM2 and 73CK2, different from the first reflecting surfaces 73YM1 and 73CK1, of the rotatable polygonal mirrors 73YM and 73CK. The horizontal synchronization sensors 82Y and 82C (detecting elements) are not irradiated with the reflected laser light beams LMd and LKd (second laser light beams).

The horizontal synchronization sensors 82Y and 82C constituted as the detecting elements detect the laser light beams LYb and LCb reflected by the first reflecting surfaces 73YM1 and 73CK1 of the rotatable polygonal mirrors 73YM and 73CK. As a result, the horizontal synchronization sensors 82Y and 82C output signals for controlling writing positions onto the photosensitive drums 2Y, 2M, 2C and 2K (image bearing members) with respect to the main scan directions (rotational axial directions).

Incidentally, as regards writing timings onto the photosensitive drums 2M and 2K shown in FIG. 5 with respect to the main scan directions (axial directions of the photosensitive drums 2), for the photosensitive drum 2M, timing when the laser light beam LYb enters the horizontal synchronization sensor 82Y will be considered. On the other hand, for the photosensitive drum 2K, timing when the laser light beam LCb enters the horizontal synchronization sensor 82C will be considered. The writing timings are determined by taking, into consideration, these timings and the influence of scanning of the photosensitive drums 2M and 2K with the laser light beams LM and LK by using the reflecting surfaces different from the reflecting surfaces by which the laser light beams LY and LC are reflected by the rotatable polygonal mirrors 73YM and 73CK.

The electrostatic latent images are formed by guiding the scanning light beams depending on the pieces of image information onto the uniformly charged surfaces of the four photosensitive drums 2Y, 2M, 2C and 2K by the first and second optical scanning apparatuses 91 and 92. Specifically, the rotatable polygonal mirrors 73YM and 73CK rotate. As a result, angles with which the laser light beams LY, LM, LC and LK emitted from the semiconductor lasers 70Y, 70M, 70C and 70K are deflected change. As a result, spot images formed by the laser light beams LY, LM, LC and LK move on the surfaces of the photosensitive drums 2Y, 2M, 2C and 2K in the axial directions of the respective photosensitive drums 2 (main scanning).

Further, by rotation of the photosensitive drums 2Y, 2M, 2C and 2K, the spot images formed by the laser light beams LY, LM, LC and LK move on the surfaces of the photosensitive drums 2Y, 2M, 2C and 2K in directions (circumferential directions) perpendicular to the axial directions of the respective photosensitive drums 2 (sub-scanning). As a result, the electrostatic latent images are formed on the uniformly charged surfaces of the photosensitive drums 2.

Figure 6:
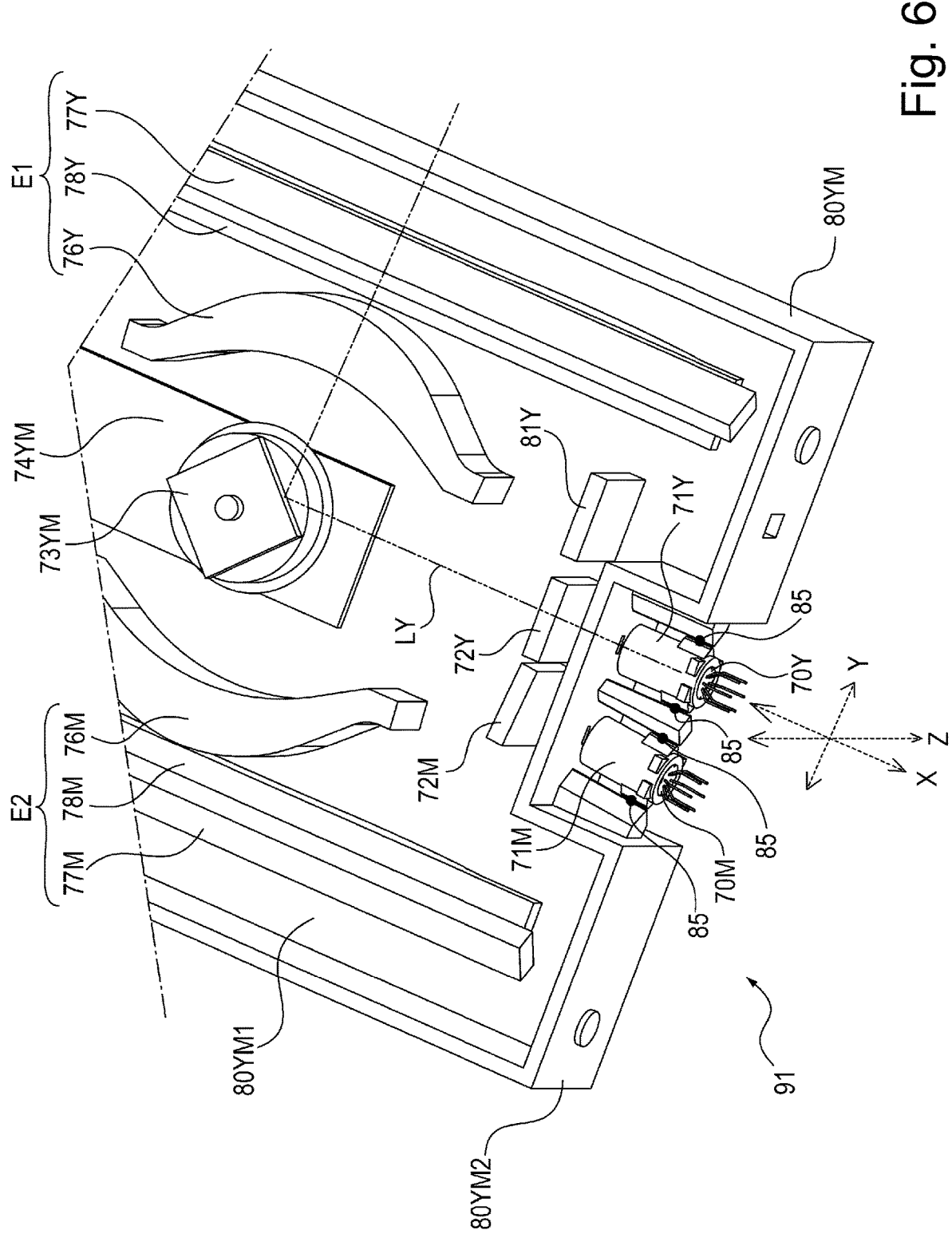
FIG. 6 is a perspective illustration showing a part of an assembling step of the optical scanning apparatus according to the present invention.
Figure 7:
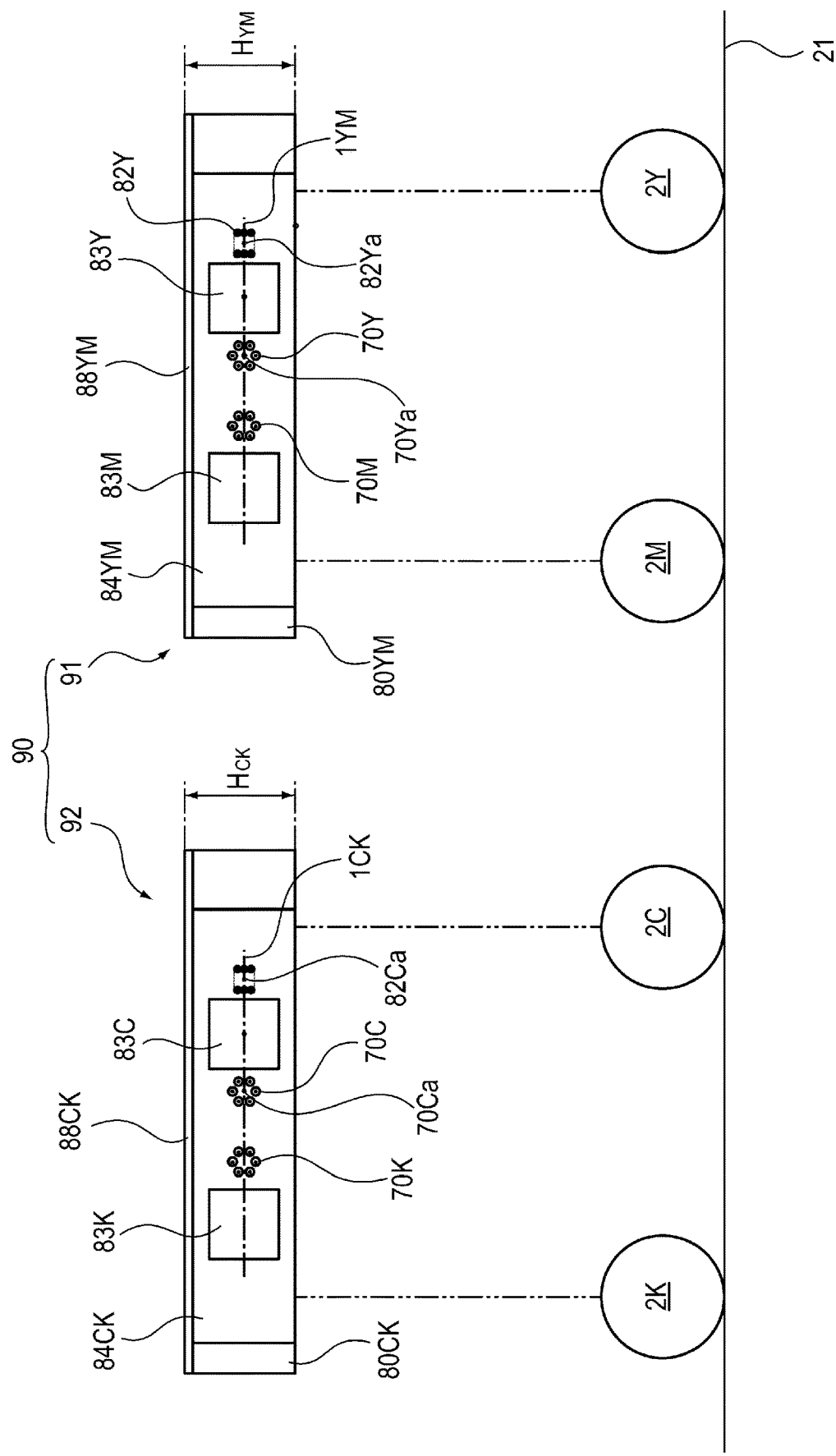
FIG. 7 is a side illustration showing structures of circuit boards of the optical scanning apparatus according to the present invention on a front surface side.

Then, using FIGS. 2 to 4, 6 and 7, effects the first and second optical scanning apparatuses 91 and 92 will be described. FIG. 6 is a perspective illustration showing a part of an assembling step of the first optical scanning apparatus 91. FIG. 7 is a side illustration showing structures of circuit boards 84YM and 84CK of the first and second optical scanning apparatuses 91 and 92 on a front surface side. The assembling step of the first optical scanning apparatus 91 will be described using FIG. 6, but the second optical scanning apparatus 92 is constituted substantially similar to the first optical scanning apparatus 91, and therefore an assembling step of the second optical scanning apparatus 92 will be omitted from description.

As shown in FIG. 6, the first optical scanning apparatus 91 is assembled by performing positional adjustment of the semiconductor lasers 70Y and 70M in a state in which the circuit board 84YM is not mounted on the side plate 80YM2 of the housing 80YM. Specifically, laser holders 71Y and 71M holding the semiconductor lasers 70Y and 70K are positionally adjusted with respect to directions of X axis, Y axis and Z axis while measuring an optical characteristic such as spot diameters of the semiconductor lasers 70Y and 70M. Thereafter, the laser holders 71Y and 71M are fixed to wall surfaces of the housing 80YM with an ultraviolet (UV) curable adhesive 85 at optimum positions of the semiconductor lasers 70Y and 70M.

Such an assembling step, there is a need to ensure a space in which the laser holders 71Y and 71M are moved for adjusting positions thereof an UV irradiation space in which the UV curable adhesive 85 is cured under application of UV rays. For this reason, in this embodiment, the semiconductor lasers 70Y and 70M are disposed so as to ensure a predetermined clearance therebetween. Incidentally, also laser holders 71C and 71K shown in FIGS. 2 to 4 hold the semiconductor laser 70C and 70K, respectively.

As shown in FIGS. 2 to 4, the laser light (beam) LY emitted from the semiconductor laser 70Y toward the rotatable polygonal mirror 73YM will be considered. Further, an optical axis LYd1 along which the laser light LY passes through the first scanning lens 76Y after being deflected by the first reflecting surface 73YM1 of the rotatable polygonal mirror 73YM will be considered. On the horizontal surface (plane), an angle $\theta dY$ formed by the laser light LY and the optical axis LYd1 will be considered.

On the other hand, the laser light (beam) LM emitted from the semiconductor laser 70M toward the rotatable polygonal mirror 73YM will be considered. Further, an optical axis LMd1 along which the laser light LM passes through the first scanning lens 76M after being deflected by the second reflecting surface 73YM2 of the rotatable polygonal mirror 73YM will be considered. On the horizontal surface (plane), an angle $\theta dM$ formed by the laser light LM and the optical axis LMd1 will be considered.

Here, a relationship between the angle $\theta dY$ and the angle $\theta dM$ is set at the following relationship (1):

$$\theta dY > \theta dM \geq 85° \quad (1)$$

As shown in FIGS. 2 to 4, a rectilinear line 4YM obtained by extending the laser light LY emitted from the semiconductor laser 70Y toward the rotatable polygonal mirror 73YM will be considered. Further, a rectilinear line 5YM obtained by extending the laser light LM emitted from the semiconductor laser 70M toward the rotatable polygonal mirror 73YM will be considered. An angle $\theta cYM$ formed by the rectilinear lines 4YM and 5YM will be considered. The angle $\theta cYM$ is larger than 0°.

For this reason, as a distance of each of the semiconductor lasers 70Y and 70M from the rotatable polygonal mirror 73YM increases, an interval between the laser light beams LY and LM also increases. As a result, by spacing each of the semiconductor lasers 70Y and 70M from the rotatable polygonal mirror 73YM, a predetermined clearance can be ensured between the semiconductor lasers 70Y and 70M.

Here, a minimum (shortest) distance DY between the laser light LY emitted from the semiconductor laser 70Y toward the rotatable polygonal mirror 73YM and an end portion 76Y1 of the first scanning lens 76L will be considered. Further, a minimum (shortest) distance DM between the laser light LM emitted from the semiconductor laser 70M toward the rotatable polygonal mirror 73YM and an end portion 76M1 of the first scanning lens 76M will be considered.

As shown in the above-described relationship (1), the angle $\theta dY$ formed by the laser light LY for yellow Y and the optical axis LYd1 is larger than the angle $\theta dM$ formed by the laser light LM for magenta M and the optical axis LMd1. For this reason, the minimum distance DY is larger than the minimum distance DM. That is, the laser light LY is more spaced from the first scanning lens 76Y than the laser light LM is spaced from the first scanning lens 76M.

Here, the laser light LYb which is the laser light LY emitted from the semiconductor laser 70Y toward the rotatable polygonal mirror 73YM and reflected by the first reflecting surface 73YM1 of the rotatable polygonal mirror 73YM and which enters the horizontal synchronization sensor 82Y will be considered. Further, the laser light LY emitted from the semiconductor laser 70Y toward the rotatable polygonal mirror 73YM will be considered. Further, an angle $\theta aY$ formed by the laser light LYb and the laser light LY will be considered. Then, the angle $\theta aY$ can be largely ensured.

As a result, as shown in FIG. 7, a predetermined space can be ensured with respect to a left-right direction (horizontal direction) between the semiconductor laser 70Y and the horizontal synchronization sensor 82Y which are mounted on the circuit board 84YM mounted on the side plate 80YM2 of the housing 80YM. Then, the laser driving IC 83Y (first driving element) for modulating the laser light LY, emitted from the semiconductor laser 70Y, depending on the image signal can be mounted on the circuit board 84YM in the space.

Mounting of the semiconductor laser 70Y and the horizontal synchronization sensor 82Y on the circuit board 84YM is performed by soldering from the back surface side to the front surface side through a through hole. For this reason, on the surface of the circuit board 84YM shown in FIG. 7, lead terminals of the semiconductor laser 70Y, lead terminals of the horizontal synchronization sensor 82Y and soldered portions where the lead terminals are soldered to land portions of a circuit pattern are shown.

Further, the semiconductor lasers 70Y and 70M in this embodiment are of an end surface emission type and use a CAN (metal can) package type. A general package size is about 5.6 mm-9 mm in outer diameter. Further, the laser driving ICs 83Y and 83M in this embodiment are of a surface mounting type, and a general package size thereof is a square of about 10 mm in one side.

As shown by the above-described relationship (1), the predetermined space can be ensured between the semiconductor laser 70Y and the horizontal synchronization sensor 82Y which are mounted on the circuit board 84YM. For this reason, on the circuit board 84YH, the laser driving IC 83Y can be mounted and disposed between the semiconductor laser 70Y and the horizontal synchronization sensor 82Y. As a result, component parts can be arranged and mounted efficiently along the longitudinal direction (horizontal direction) of the circuit board 84YM shown as the left-right direction in FIG. 7. As a result, a height of the circuit board 84YM with respect to an up-down (vertical) direction, of FIG. 7, which is a widthwise direction of the circuit board 84YM can be made low, so that a maximum thickness $H_{YM}$ of the first optical scanning apparatus 91 can also be reduced.

Further, the second optical scanning apparatus 92 is also constituted similarly as the first optical scanning apparatus 91. In FIGS. 2 to 4, the laser light LCb which is the laser light LC emitted from the semiconductor laser 70C toward the rotatable polygonal mirror 73CK and reflected by the first reflecting surface 73CK1 of the rotatable polygonal mirror 73CK and which enters the horizontal synchronization sensor 82C will be considered. Further, the laser light LC emitted from the semiconductor laser 70C toward the rotatable polygonal mirror 73CK will be considered. An angle θC is an angle formed by the laser light LCb and the laser light LC.

Further, an angle θcCK is an angle formed by a rectilinear line 4CK obtained by extending the laser light LC emitted from the semiconductor laser 70C toward the rotatable polygonal mirror 73CK and a rectilinear line 5CK obtained by extending the laser light LK emitted from the semiconductor laser 70K toward the rotatable polygonal mirror 73CK. Further, DC represents a minimum distance between the laser light LC and an end portion 76C1 of the first scanning lens 76C. DK represents a minimum distance between the laser light LK and an end portion 76K1 of the first scanning lens 76K.

Further, 83C and 83K shown in FIG. 7 represent laser driving ICs for modulating laser light beams LC and LK, emitted from the semiconductor lasers 70C and 70K, respectively, depending on image signals. The respective laser driving ICs 83Y, 83M, 83C and 83K are constituted as driving elements for generating the laser light beams LY, LM, LC and LK modulated depending on the image signals by driving the semiconductor lasers 70Y, 70M, 70C and 70K (the plurality of light sources).

Here, the laser light (beam) LC emitted from the semiconductor laser 70C toward the rotatable polygonal mirror 73CK shown in FIGS. 2 to 4 will be considered. Further, an optical axis LCd1 along which the laser light LC passes through the first scanning lens 76C after being deflected by the first reflecting surface 73YC1 of the rotatable polygonal mirror 73CK will be considered. Further, on the horizontal surface (plane), an angle θdC formed by the laser light LC and the optical axis LCd1 will be considered.

Further, the laser light (beam) LK emitted from the semiconductor laser 70K toward the rotatable polygonal mirror 73CK will be considered. Further, an optical axis LMd1 along which the laser light LK passes through the first scanning lens 76K after being reflected and deflected by the second reflecting surface 73CK2 of the rotatable polygonal mirror 73CK will be considered. On the horizontal surface (plane), an angle θdK formed by the laser light LK and the optical axis LKd1 will be considered.

Here, a relationship between the angle θdC and the angle θdK is set at the following relationship (2):

$$\theta dC > \theta dK \geq 85° \tag{2}$$

That is, as shown in FIGS. 2 to 4, the laser light beams LY and LC (first laser light beams) emitted from the semiconductor lasers 70Y and 70C (first light sources) toward the first reflecting surfaces 73YM1 and 73CK1 of the rotatable polygonal mirrors 73YM and 73CK, respectively, will be considered. Further, on the flat surfaces including the laser light beams LY and LC, first directions perpendicular to the longitudinal directions of the first scanning lenses 76Y and 76C (first scanning optical portions) provided on the semiconductor laser 70Y and 70C sides (on the first light source sides) will be considered.

The first directions are directions of optical axes LYd1 and LCd1 of light beams passing through centers of the first scanning lenses 76Y and 76C in directions perpendicular to the longitudinal directions of the first scanning lenses 76Y and 76C. Further, angles θdY and θdC formed by the laser light beams LY and LC (first laser light beams) and the optical axes LYd1 and LCd1 (first directions) on the same flat plane are angles θ1.

On the other hand, the laser light beams LM and LK (second laser light beams) emitted from the semiconductor lasers 70M and 70K (second light sources) toward the second reflecting surfaces 73YM2 and 73CK2 of the rotatable polygonal mirrors 73YM and 73CK, respectively, will be considered. Further, on the flat surfaces including the laser light beams LM and LK, second directions perpendicular to the longitudinal directions of the first scanning lenses 76M and 76K (second scanning optical portions) provided on the semiconductor laser 70M and 70K sides (on the second light source sides) will be considered. The second directions are directions of optical axes LMd1 and LKd1 of light beams passing through centers of the first scanning lenses 76M and 76K in directions perpendicular to the longitudinal directions of the first scanning lenses 76M and 76K.

Further, angles θdM and θdK formed by the laser light beams LM and LK (second laser light beams) and the optical axes LMd1 and LKd1 (second directions) on the same flat plane are angles θ2. At this time, the angles θ1 and θ2 are set so as to satisfy the following relationship (3).

$$\theta 1 > \theta 2 \geq 85° \tag{3}$$

The angles θ1 and θ2 are set at 85° or more. Further, the following component parts are mounted on the circuit boards 84YM and 84CK shown in FIG. 7 so as to satisfy the above-described relationship 83). That is, the semiconductor lasers 70Y and 70C (first light sources), the laser driving ICs 83Y and 82 (first driving elements) 9 and the horizontal synchronization sensors 82Y and 82C (detecting elements) are mounted along the longitudinal directions (the left-right direction of FIG. 7) of the circuit board 84YM and 84CK. On the circuit boards 84YM and 84CK, the semiconductor lasers 70Y and 70C (first light sources), the laser driving ICs 83Y and 83C (first driving elements) and the horizontal synchronization sensors 82Y and 82C (detecting elements) are arranged in a named order.

As shown in FIG. 7, on the circuit boards 84YM and 84CK, the laser driving ICs 83Y and 83C (first driving elements) are mounted, respectively. here, axes 1YM and 1CK connecting centers 70Ya and 70Ca of the semiconductor lasers 70Y and 70C (first light sources) with centers 82Ya and 82Ca of the horizontal synchronization sensors 82Y and 82C (detecting elements) will be considered. The laser driving ICs 83Y and 83C are mounted on the axes 1YM and 1CK, respectively.

As shown by the above-described relationship (2), the predetermined space can be ensured between the semiconductor laser 70C and the horizontal synchronization sensor 82C which are mounted on the circuit board 84CK. As a result, on the circuit board 84CK, the laser driving IC 83C (first driving element) can be mounted and disposed between the semiconductor laser 70C and the horizontal synchronization sensor 82C. Thus, component parts can be arranged and mounted efficiently along the longitudinal direction (horizontal direction) of the circuit board 84CK shown as the left-right direction in FIG. 7. As a result, a height of the circuit board 84CK with respect to an up-down (vertical) direction, of FIG. 7, which is a widthwise direction of the circuit board 84CK can be made low As a result, a maximum thickness $H_{CK}$ of the second optical scanning apparatus 92 can also be reduced. As a result, the second optical scanning apparatus 92 can also achieve effects similar to those of the first optical scanning apparatus 91.

Incidentally, in this embodiment, the horizontal synchronization sensors 82Y and 82C were disposed in optical systems corresponding to the photosensitive drums 2 for yellow Y and cyan C, but the present invention is not limited thereto. As in this embodiment, the laser light LK emitted from the semiconductor laser 70K toward the rotatable polygonal mirror 73CK is not detected by the horizontal synchronization sensor.

The angle θdK formed by the laser light LK emitted from the semiconductor laser 70K toward the rotatable polygonal mirror 73CK and the optical axis LKd1 along which the laser light LK passes through the first scanning lens 76K after being reflected and deflected by the second reflecting surface 73CK2 of the rotatable polygonal mirror 73CK will be considered.

Further, the angle θdC formed by the laser light LC emitted from the semiconductor laser 70C toward the rotatable polygonal mirror 73CK and the optical axis LCd1 along which the laser light LC passes through the first scanning lens 76C after being reflected and deflected by the first reflecting surface 73CK1 of the rotatable polygonal mirror 73CK will be considered.

Figure 8:
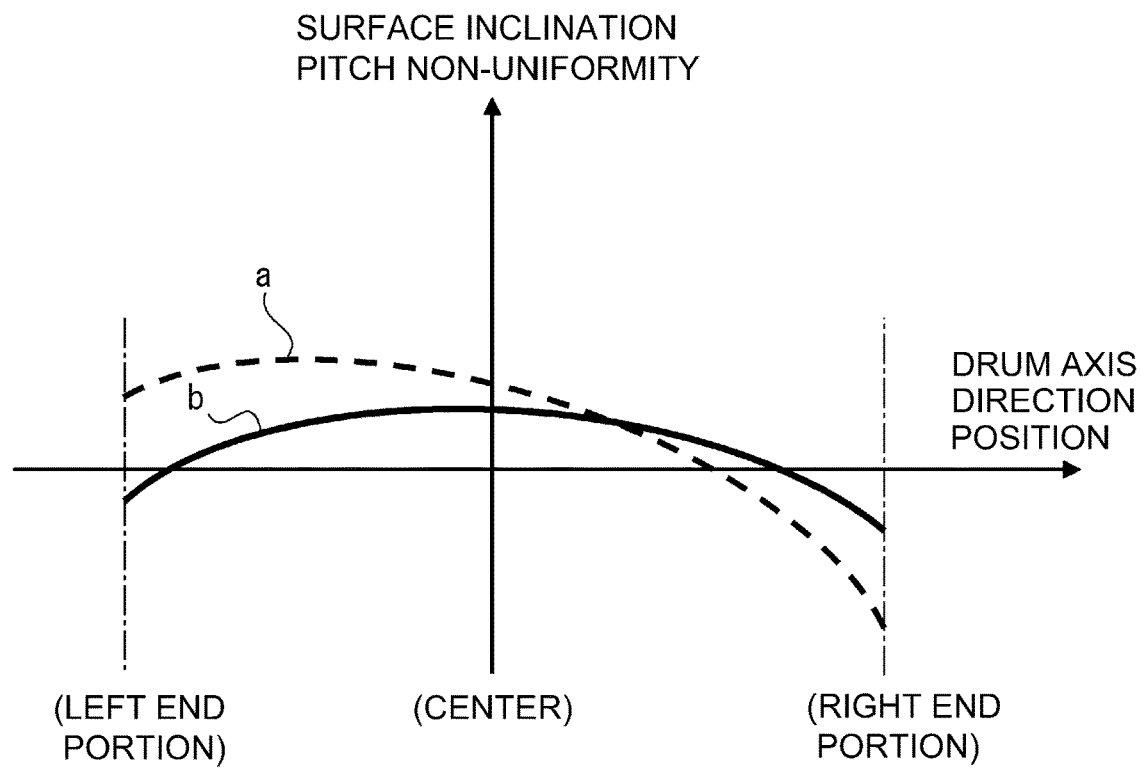
FIG. 8 is a diagram showing an optical characteristic of the optical scanning apparatus according to the present invention.

Further, as represented by the above-described relationship (2), the angle θdK may desirably be made smaller than the angle θdC on the side where the angle θdC is detected by the horizontal synchronization sensor 82C. The reason therefor will be described using FIG. 8. FIG. 8 is a diagram showing an optical characteristic of the optical scanning apparatus 90 of this embodiment. FIG. 8 is a graph showing beam interval non-uniformity (pitch non-uniformity) of the laser light L on the surface of the photosensitive drum 2 with respect to a sub-scan direction (circumferential direction) when inclination (surface inclination) of the reflecting surface of the rotatable polygonal mirror 73 occurs. In FIG. 8, an ordinate represents surface inclination pitch non-uniformity, and an abscissa represents a scanning position along the axial direction of the photosensitive drum 2.

The case where the angle θd formed by the laser light L emitted from the semiconductor laser 70 toward the rotatable polygonal mirror 73 and the optical axis Ld1 along which the laser light L passes through the first scanning lens 76 after being reflected and deflected by the reflecting surface of the rotatable polygonal mirror 73 is large is indicated by a broken line a. Further, the case where the angle θd is small is indicated by a solid line b.

As the angle θd formed by the laser light L and the optical axis Ld1 becomes large, the laser light L strikes the reflecting surface of the rotatable polygonal mirror 73 at an acute angle (shallow angle). For this reason, even when a beam width of the laser light L before being reflected by the reflecting surface of the rotatable polygonal mirror 73 is the same, the beam width of the laser light L on the reflecting surface of the rotatable polygonal mirror 73. In that case, there is a need that the reflected laser light L is out of an effective region of the reflecting surface of the rotatable polygonal mirror 73. For this reason, a reflecting point of the rotatable polygonal mirror 73 at the reflecting surface has to be shifted, with the result that as indicated by the broken line a of FIG. 8, beam interval non-uniformity (surface inclination pitch non-uniformity) of the laser light L becomes large.

A plurality of measuring methods of the beam interval non-uniformity (surface inclination pitch non-uniformity) of the laser light L exist. For example, at a position corresponding to the surface of the photosensitive drum 2, a fluctuation in position with respect to the sub-scan direction of the laser light L with which the photosensitive drum surface is scanned by the light deflector 74 can be measured by a line sensor in which a plurality of pixels are arranged in the sub-scan direction (direction perpendicular to the main scan direction).

As indicated by the solid line b of FIG. 8, in the case where the angle θd formed by the laser light L and the optical axis Ld1 is small, a difference in beam interval non-uniformity (surface inclination non-uniformity) at left and right ends of the photosensitive drum 2 on the photosensitive drum surface with respect to the main scan direction (the axial direction of the photosensitive drum 2) can be made small. On the other hand, as indicated by the broken line a of FIG. 8, in the case where the angle θd formed by the laser light L and the optical axis Ld1 is large, a difference in beam interval non-uniformity (surface inclination non-uniformity) at left and right ends of the photosensitive drum 2 on the photosensitive drum surface with respect to the main scan direction (the axial direction of the photosensitive drum 2) becomes large.

For this reason, consequently, an absolute value of the beam interval non-uniformity (surface inclination non-uniformity of the laser light L also becomes large. As a result, an image problem such as moire (interference fringe) is liable to occur. Here, the moire (interference fringe) is a phenomenon such that a striped pattern which does not originally exist on an image unintendedly appears when the image is printed (formed).

Generally, in the color image forming apparatus, a highest print quality is required for the black K for forming a monochromatic image high in use frequency. Here, the laser light LK emitted from the semiconductor laser 70K toward the rotatable polygonal mirror 73CK on the black K side as shown in FIGS. 2 to 4 will be considered. Further, an optical axis LKd1 along which the laser light LK passes through the first scanning lens 76K after being reflected and deflected by the second reflecting surface 73CK2 of the rotatable polygonal mirror 73CK will be considered. Further, the angle θdK formed by the laser light LK and the optical axis LKd1 will be considered.

Further, the laser light LC emitted from the semiconductor laser 70C toward the rotatable polygonal mirror 73CK on the cyan C side will be considered. Further, an optical axis LCd1 along which the laser light LC passes through the first scanning lens 76C after being reflected and deflected by the first reflecting surface 73CK1 of the rotatable polygonal mirror 73CK will be considered. Further, the angle θdC formed by the laser light LC and the optical axis LCd1 will be considered. By setting the angle θdK so as to be smaller than the angle θdC, the beam interval non-uniformity (surface inclination pitch non-uniformity) of the laser light LK can be made small.

As a result, a high print quality can be maintained by using the semiconductor laser 70K (second light source) shown in FIG. 4 for forming the monochromatic image high in use frequency. Further, the circuit boards 84YM and 84CK may desirably be disposed with respect to a direction perpendicular to the laser light beams LY and LC emitted from the semiconductor lasers 70Y and 70C on sides where the laser light beams LY and LC are detected by the horizontal synchronization sensors 82Y and 82C.

Figure 9:
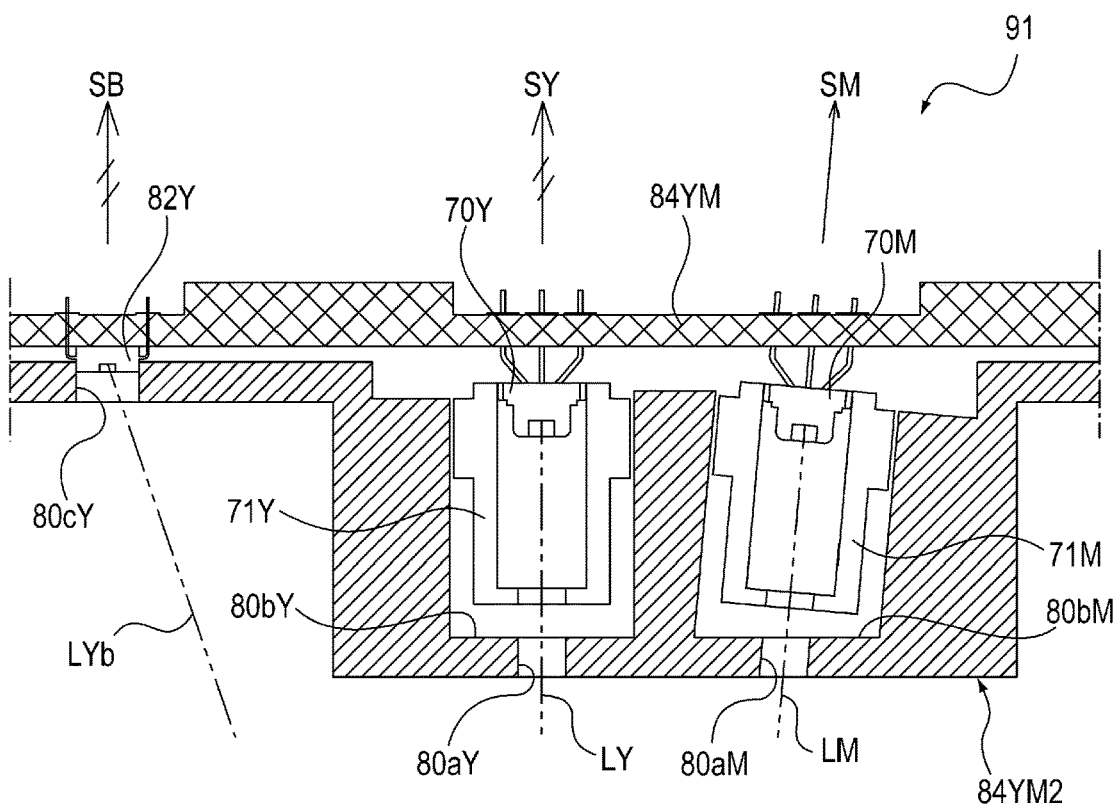
FIG. 9 is a sectional illustration showing a structure of peripheral component parts of a semiconductor laser of the optical scanning apparatus according to the present invention.

In this embodiment, the laser light beams LY and LC (first laser light beams) emitted from the semiconductor lasers 70Y and 70C (first light sources) toward the first reflecting surfaces 73YM1 and 73CK1 of the rotatable polygonal mirrors 73YM and 73CK will be considered. Further, mounting surfaces 84YMa and 84CKa of the circuit boards 84YM and 84CK will be considered. Further, the semiconductor lasers 70Y and 70C are disposed so that the laser light beams LY and LC are perpendicular to the mounting surfaces 84YMa and 84CKa, respectively. The reason therefor will be described using FIG. 9. FIG. 9 is a sectional illustration showing structures of puerperal component parts of the semiconductor lasers 70Y and 70M of the optical scanning apparatus 91 of this embodiment.

The optical scanning apparatus 91 shown in FIG. 9 includes diaphragms (lens stops) 80aY and 80aM for forming spots of the laser light beams LY and LM emitted from the semiconductor lasers 70Y and 70M toward the rotatable polygonal mirrors 73YM. The respective diaphragms 80aY and 80aM are provided by being penetrated through the side plate 80 YM2 of the housing 80YM.

A positioning hole 80cY is provided so as to penetrate through the side plate 80YM. In this positioning hole 80cY, an outer configuration of the horizontal synchronization sensor 82Y is engaged. By engaging the outer configuration of the horizontal synchronization sensor 82Y in the positioning hole 80cY, positional accuracy of the horizontal synchronization sensor 82Y can be ensured.

The diaphragms 80aY and 80aM and the positioning hole 80cY are provided so as to penetrate through the side plate 80YM2 of the housing 80YM. For this reason, in the case where the housing 80YM is intended to be prepared by a molded product, the housing 80YH is prepared by molding with a slide core. Here, the slide core is a component part for removing the molded product by sliding a core (metal mold) provided with the diagrams 80aY and 80aM and the positioning hole 80cY which are through holes provided in the side plate 80YM2 of the housing 80YM.

With the diaphragms 80aY and 80aM, recessed portions 80bY and 80bM in which the light holders 71Y and 71M are engaged communicate, respectively. The housing 80YM is prepared by molding in a state in which the slide core is inserted in the recessed portions 80bY and 80bM, the diaphragms 80aY and 80aM and the positioning hole 80cY.

FIG. 9 shows drawing directions of the slide core after the diaphragms 80aY and 80aM and the positioning hole 80cY are formed by the molding. Drawing directions SB and SY after the diaphragm 80aY, the positioning hole 80cY and the recessed portion 80bY are prepared by the molding can be made parallel to each other. For this reason, a mold structure can be simplified. In the case where the drawing directions SB and SY of the slide core are not parallel to each other, there are three drawing directions SB, SY and SM, so that the mold structure becomes complicated. For this reason, the case where the slide core is not provided would be also considered.

Modified Embodiments

Incidentally, in FIGS. 2 to 4 and 7, an example in which the two semiconductor lasers 70Y and 70M (or 70C and 70K) are mounted on the single circuit board 83YM (or 84CK) is shown. As another example, as shown in FIG. 10, a single semiconductor laser 70Y (70M) may also be mounted on a single circuit board 86Y (86M).

Figure 10:
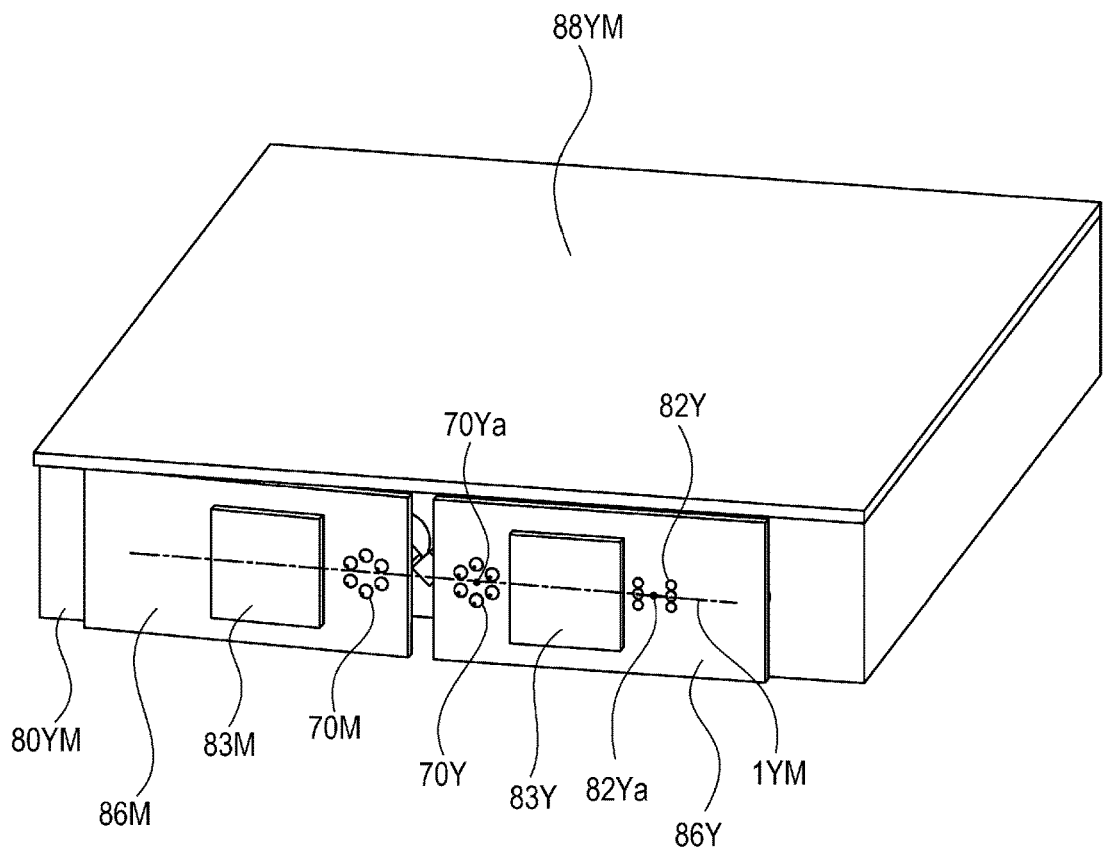
FIG. 10 is a perspective illustration showing a modified embodiment of the circuit board of the optical scanning apparatus according to the present invention.

On the circuit board 86Y shown in FIG. 10, the semiconductor laser 70Y, the horizontal synchronization sensor 82Y and the laser driving IC 83Y are mounted by being arranged in the longitudinal direction (horizontal direction) of the circuit board 86Y shown as a left-right direction of FIG. 10. As a result, effects similar to the above-described effects can be achieved. On the circuit board 86M shown in FIG. 10, the semiconductor laser 70M and the laser driving IC 83M are mounted by being arranged in the longitudinal direction (horizontal direction) of the circuit board 86M shown as the left-right direction of FIG. 10.

Figure 11:
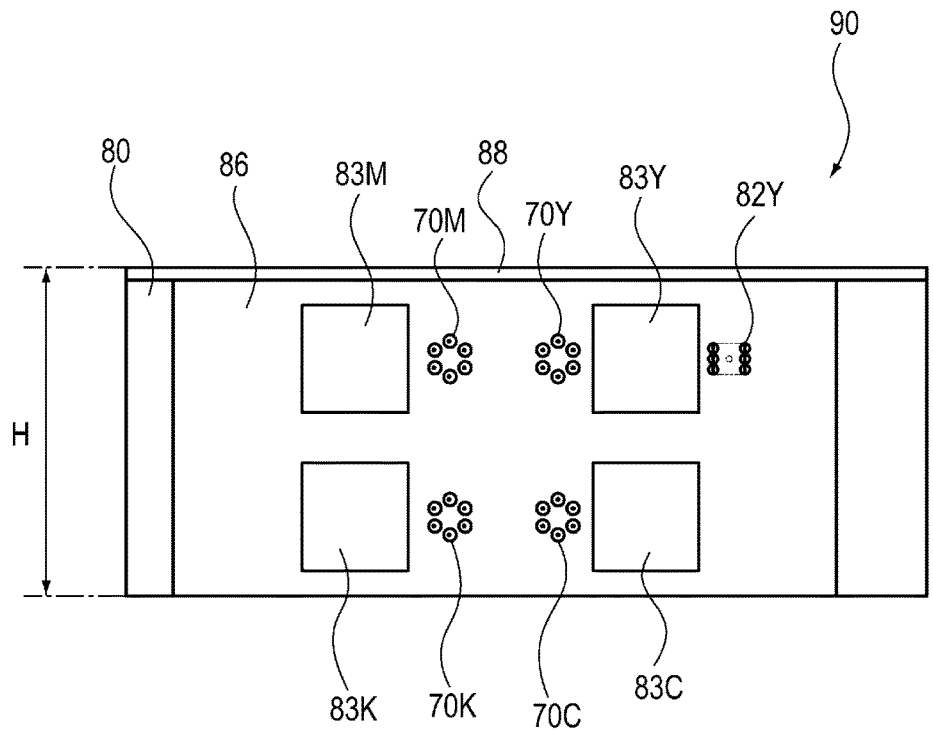
FIG. 11 is a side illustration showing a structure of a circuit board of another optical scanning apparatus in which semiconductor lasers are vertically provided with respect to a sub-scan direction and four photosensitive drums are scanned with laser light by a single light deflector.
Figure 12:
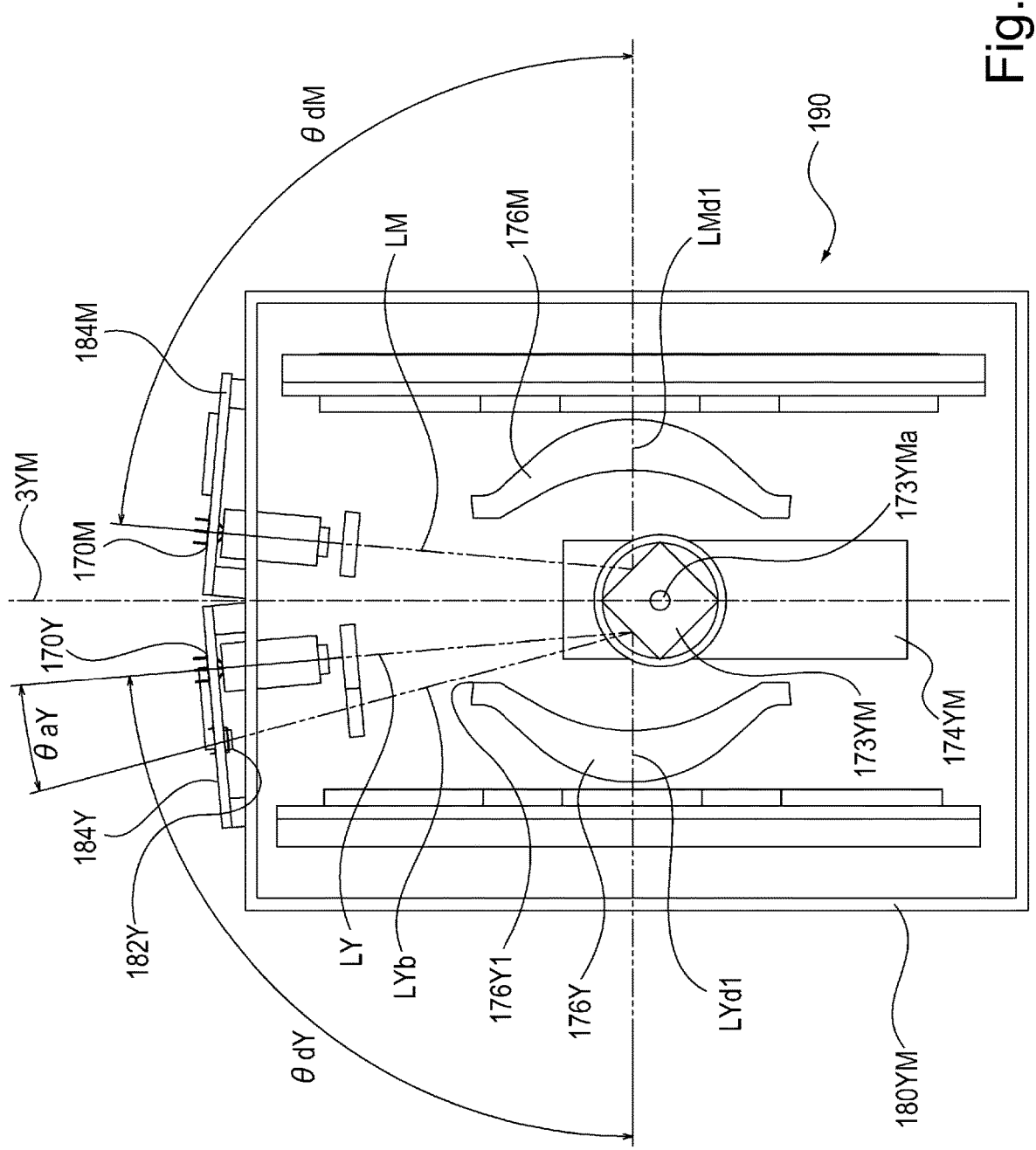
FIG. 12 is a top plan illustration showing a structure of an optical scanning apparatus in a reference example.
Figure 13:
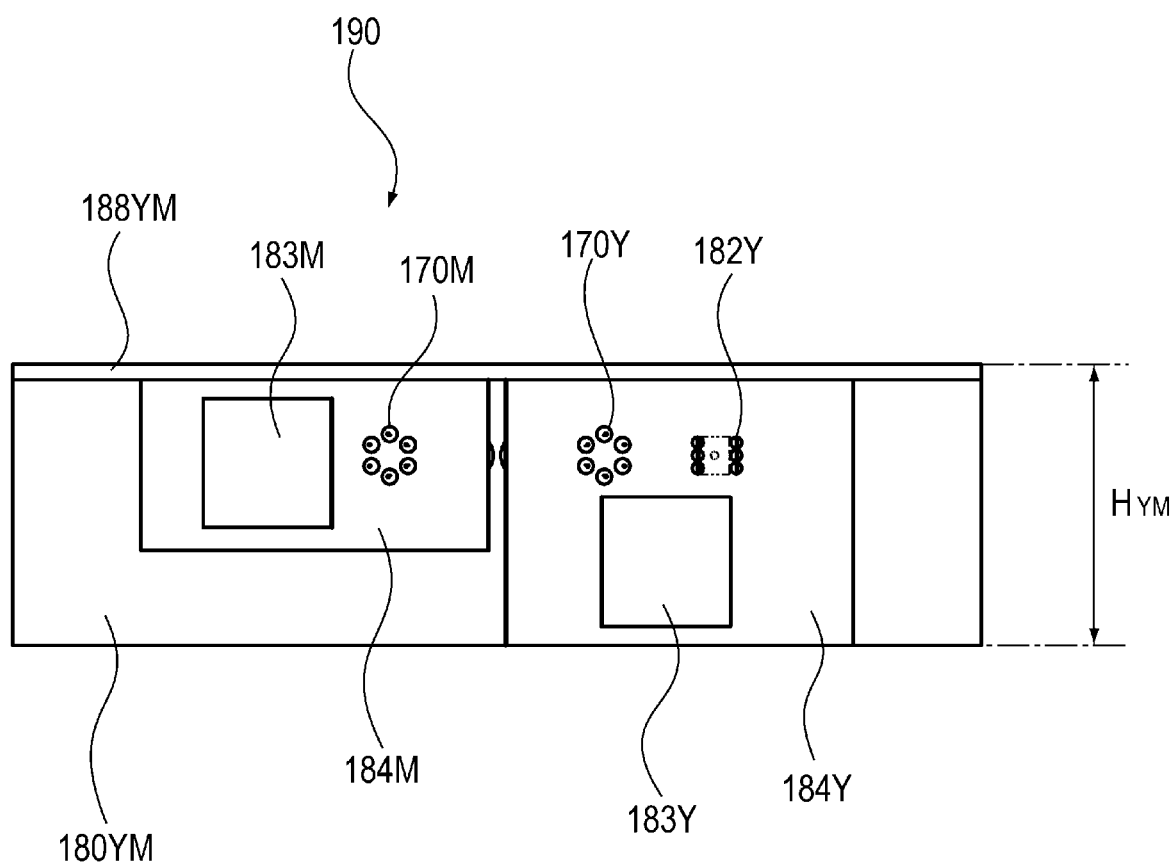
FIG. 13 is a side illustration showing a structure of a circuit board of the optical scanning apparatus in the reference example on a front surface side.

FIG. 11 is a side illustration showing a structure of a circuit board 86 of another optical scanning apparatus 90 on a front surface side. In FIG. 11, with respect to the sub-scan direction, semiconductor lasers 70K and 70M and semiconductor lasers 70Y and 70C are vertically provided. Further, the photosensitive drums 2Y, 2M, 2C and 2K are scanned with the laser light beams LY, LM, LC and LK by a single light deflector 74.

In the above-described embodiment, as shown in FIGS. 2 to 5, a constitution in which the two light deflectors 74YM and 74CK are used for the four photosensitive drums 2Y, 2M, 2C and 2K was employed. As another constitution, as shown in FIG. 11, with respect to the sub-scan direction (circumferential direction of photosensitive drum 2), the semiconductor lasers 70Y and 70C shown in FIG. 11 are vertically disposed with respect to a widthwise direction of circuit board 86, and the semiconductor lasers 70M and 70K are vertically disposed with respect to the widthwise direction of the circuit board 86.

Further, a constitution in which the four photosensitive drums 2Y, 2M, 2C and 2K are scanned with the laser light beams LY, LM, LC and LK by the single light deflector 74 will be considered. Also in that case, on the circuit board 86, the semiconductor laser 70Y, the laser driving IC 83Y and the horizontal synchronization sensor 82Y are arranged and mounted in a named order in the longitudinal direction (horizontal direction) of the circuit board 86. As a result, effects similar to those described above can be obtained.

According to the above-described constitutions, the height of the circuit board 86 can be decreased by arranging and mounting the semiconductor laser 70Y, the horizontal synchronization sensor 82Y and the laser driving IC 83Y in the longitudinal direction (horizontal direction) of the circuit board 86. As a result, the maximum height H of the optical scanning apparatus 90 can be reduced. As a result, a decrease in height of the image forming apparatus 100 in which the optical scanning apparatus 90 is mounted can be realized, so that downsizing of the image forming apparatus 100 can be realized.

According to the present invention, it becomes possible to downsize the optical scanning apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-049159 filed on Mar. 16, 2018, which is hereby incorporated by reference herein in its entirety.

What is claimed is:
1. An optical scanning apparatus comprising:
a first light source;
a second light source;

a first driving element configured to drive said first light source to generate first laser light depending on an image signal;

a second driving element configured to drive said second light source to generate second laser light depending on the image signal;

a rotatable polygonal mirror having a plurality of reflecting surfaces, the rotatable polygonal mirror being configured to reflect and deflect the first and second laser lights, wherein the rotatable polygonal mirror reflects the second laser light in a direction opposite to a reflection direction of the first laser light;

a first scanning optical portion configured to guide, to a first image bearing member, the first laser light reflected by a reflecting surface;

a second scanning optical portion configured to guide, to a second image bearing member, the second laser light reflected by a reflecting surface;

a detecting element configured to detect the first laser light reflected by the reflecting surface and then to output a signal for controlling a writing position onto the first image bearing member with respect to a main scan direction; and a circuit board on which at least said first light source, said first driving element and said detecting element are mounted, wherein said first light source, said first driving element and said detecting element are arranged in a named order on said circuit board in the main scan direction, wherein said first driving element mounted on said circuit board is mounted on an axis connecting a center of said first light source and a center of said detecting element, and wherein the following relationship is satisfied:

$$\theta 1 > \theta 2,$$

where $\theta 1$ is an angle formed by a direction of the first laser light emitted from said first light source toward the reflecting surface and a first direction perpendicular to a longitudinal direction of said first scanning optical portion on the same flat plane including the first laser light, and $\theta 2$ is an angle formed by a direction of the second laser light emitted from said second light source toward the reflecting surface and a second direction perpendicular to a longitudinal direction of said second scanning optical portion on the same flat plane including the second laser light.

2. An optical scanning apparatus according to claim 1, wherein said first light source, said first driving element and said detecting element are mounted on said circuit board along a longitudinal direction of said circuit board.

3. An optical scanning apparatus according to claim 1, wherein said $\theta 1$ and said $\theta 2$ are set at 85° or more.

4. An optical scanning apparatus according to claim 1, wherein said optical scanning apparatus is disposed so that the first laser light emitted from said first light source toward the reflecting surface and a mounting surface of said circuit board are perpendicular to each other.

5. An optical scanning apparatus according to claim 1, wherein said second light source is used for forming a monochromatic image.

6. An optical scanning apparatus according to claim 1, wherein said first scanning optical portion and said second scanning optical portion are provided symmetrically with respect to said rotatable polygonal mirror.

7. An optical scanning apparatus according to claim 6, wherein said first scanning optical portion and said second scanning optical portion are disposed symmetrically with a rectilinear line passing through a rotation center of said rotatable polygonal mirror as an axis of symmetry, wherein with the axis of symmetry as a boundary, said first light source, said first driving element and said detecting element are provided on a side where said first scanning optical portion is provided, and said second light source and said second driving element are provided on a side where said second scanning optical portion is provided.

8. An image forming apparatus comprising:

an optical scanning apparatus according to claim 1; and an image forming portion including a plurality of image bearing members to be irradiated and scanned with laser light by said optical scanning apparatus and configured to form, on a recording material, images born on said image bearing members.

9. An optical scanning apparatus comprising:

a first light source;

a second light source;

a first integrated circuit configured to drive said first light source to generate first laser light depending on an image signal;

a second integrated circuit configured to drive said second light source to generate second laser light depending on the image signal;

a rotatable polygonal mirror having a plurality of reflecting surfaces, the rotatable polygonal mirror being configured to reflect and deflect the first and second laser lights, wherein the rotatable polygonal mirror reflects the second laser light in a direction opposite to a reflection direction of the first laser light;

a first fθ lens configured to guide, to a first image bearing member, the first laser light reflected by a reflecting surface;

a second fθ lens configured to guide, to a second image bearing member, the second laser light reflected by a reflecting surface;

a detecting sensor configured to detect the first laser light reflected by the reflecting surface and then to output a signal for controlling a writing position onto the first image bearing member with respect to a main scan direction; and a circuit board on which at least said first light source, said first integrated circuit and said detecting sensor are mounted, wherein said first light source, said first integrated circuit and said detecting sensor are arranged in a named order on said circuit board in the main scan direction, and wherein the following relationship is satisfied:

$$\theta 1 > \theta 2,$$

where $\theta 1$ is an angle formed by a direction of the first laser light emitted from said first light source toward the reflecting surface and a first direction perpendicular to a longitudinal direction of said first fθ lens on the same flat plane including the first laser light, and $\theta 2$ is an angle formed by a direction of the second laser light emitted from said second light source toward the reflecting surface and a second direction perpendicular to a longitudinal direction of said second fθ lens on the same flat plane including the second laser light.

10. An optical scanning apparatus according to claim 9, wherein said $\theta 1$ and said $\theta 2$ are set at 85° or more.

11. An optical scanning apparatus according to claim 9, wherein said optical scanning apparatus is disposed so that the first laser light emitted from said first light source toward the reflecting surface and a mounting surface of said circuit board are perpendicular to each other.

12. An optical scanning apparatus according to claim 9, wherein said first fθ lens and said second fθ lens are provided symmetrically with respect to said rotatable polygonal mirror.

13. An optical scanning apparatus according to claim 12, wherein said first fθ lens and said second fθ lens are disposed symmetrically with a rectilinear line passing through a rotation center of said rotatable polygonal mirror as an axis of symmetry,
   wherein with the axis of symmetry as a boundary, said first light source, said first integrated circuit and said detecting sensor are provided on a side where said first fθ lens is provided, and said second light source and said second integrated circuit are provided on a side where said second fθ lens is provided.

14. An image forming apparatus comprising:
   an optical scanning apparatus according to claim 9; and
   an image forming portion including a plurality of image bearing members to be irradiated and scanned with laser light by said optical scanning apparatus and configured to form, on a recording material, images born on said image bearing members.

* * * * *